US006986375B2

(12) United States Patent
Maruoka et al.

(10) Patent No.: US 6,986,375 B2
(45) Date of Patent: Jan. 17, 2006

(54) HEAVY DUTY RADIAL TIRE

(75) Inventors: Kiyoto Maruoka, Kobe (JP); Yasuo Mitarai, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 0 days.

(21) Appl. No.: 11/013,467

(22) Filed: Dec. 17, 2004

(65) Prior Publication Data

US 2005/0150583 A1 Jul. 14, 2005

(30) Foreign Application Priority Data

Dec. 25, 2003 (JP) ............................. 2003-430975
Dec. 25, 2003 (JP) ............................. 2003-430976
Dec. 25, 2003 (JP) ............................. 2003-430977

(51) Int. Cl.
*B60C 15/00* (2006.01)
(52) U.S. Cl. ....................................... 152/543; 152/552
(58) Field of Classification Search ................ 152/543, 152/552
See application file for complete search history.

(56) References Cited

U.S. PATENT DOCUMENTS

2005/0045260 A1 * 3/2005 Maruoka et al. ........ 152/552 X

FOREIGN PATENT DOCUMENTS

JP          11-321244 A       11/1999
JP          2000-219016 A     8/2000

* cited by examiner

*Primary Examiner*—Adrienne C. Johnstone
(74) *Attorney, Agent, or Firm*—Birch, Stewart, Kolasch & Birch, LLP

(57) ABSTRACT

The invention relates to the heavy duty radial tire with a bead-wind structure. And carcass cords of the carcass extend while inclining to one side in the tire and the other-side inclined region that extends while inclining to the other side with a lowermost position of the bead core in the tire axial direction being substantially the center. Or, the reinforcing ply is similarly inclined as the carcass cords. With this arrangement, it is possible to improve engaging force of the carcass ply or the reinforcing ply to the bead cores so that shifts of the carcass ply in a blow-by direction can be effectively restricted. It is also an object to provide a heavy duty radial tire that is capable of restricting damages of the beads at the inner end positions A.

21 Claims, 12 Drawing Sheets

PRIOR ART

HEAVY DUTY RADIAL TIRE

BACKGROUND OF THE INVENTION

1. Field of the Invention

The present invention relates to a heavy duty radial tire of improved bead durability while achieving a light-weighted structure upon improving a lapel structure of carcass cords of a carcass or reinforcing cords of a reinforcing ply.

2. Background Art

In these years, there have been suggested tires having a bead structure (hereinafter referred to as bead-wind structure) as illustrated in FIG. 14 in which ply lapelled portions a of a carcass are wound around bead cores b by approximately a full round, and end portions a1 of the ply lapelled portions a that protrude from a top surface bs of the bead cores b in a radial direction are pinched between the bead cores b and bead apex rubbers c. Reference should be made, for instance, to Japanese Published Patent Application No. H11-321244, Japanese Published Patent Application No. 2000-219016.

According to such a structure, the ply lapelled portions a are interrupted around the bead cores b so that no stress at the time of deformation of the tire is applied to the end portions a1 thereof. It is accordingly possible to effectively restrict damages such as loosing of cords originating at such end portions a1. Moreover, since the ply lapelled portions a are of short length, it will also be of advantage that the weight of the tire can be decreased.

However, since the length of the end portions a1 is short in such a structure, it will be difficult to sufficiently engage the carcass ply so that it tends to be shifted in a direction of blow-by. As a result, a large shear strain is generated between the carcass ply and the bead cores b at inner end positions A of the bead cores b in the tire axial direction at the time of deformation of the tire so that cord loosing of the carcass cords is induced. Such a problem can be reduced by separating the end portions a1 from the bead cores b and by reducing strong bending-return (so-called spring-back) of the end portions a1 that are caused, for instance, in the course of forming raw tires. In this respect, such instances remarkably occur in case the temperature of the bead portion has excessively raised upon catching heat of brake pads or others to cause thermal softening of the rubber. It is known that such tendency is similarly exhibited also with a reinforcing ply that is provided for improving the rigidity of the bead portion.

SUMMARY OF THE INVENTION

The present invention accordingly relates to a heavy duty radial tire having a ply lapelled portion with relatively short ply lapelled portions that terminate around the bead cores. It further comprises one-side inclined region in which carcass cords of the carcass extend while inclining to one side in the tire circumferential direction and the other-side inclined region that extends while inclining to the other side with a lowermost position of the bead core in the tire axial direction being substantially the center. Moreover, the reinforcing ply is similarly inclined as the carcass cords, provided that the ply lapelled portions are short. With this arrangement, it is possible to improve engaging force of the carcass ply and the reinforcing ply to the bead cores so that shifts of the carcass ply in a blow-by direction can be effectively restricted. It is also an object to provide a heavy duty radial tire that is capable of restricting damages of the beads at the inner end positions A.

It is therefore, the present invention to provide a heavy duty tire comprising a carcass ply in which a carcass ply main body that extends from a tread portion over side wall portions up to bead cores of bead portions and ply lapelled portions that are lapelled from inside to outside in the tire axial direction around the bead cores, wherein each ply lapelled portion comprising of a main portion and a winding portion, the main portion being bent along an inner surface in the tire axial direction, a lower surface in the radial direction and an outer surface in the tire axial direction of the bead core, the winding portion continuing from the main portion and extending towards the ply main body portion upon separating from the top surface thereof in the radial direction at an angle that is smaller than 90 degrees, and the ply lapelled portion including one-side inclined region that extends up to an inflection R0 that is located in a core lower surface opposing region and the other-side inclined region that extends from the inflection R0 to a tip end Pa of the ply lapelled portion, wherein the core lower surface opposing region is a region in which carcass cords face to the lower surface of the bead core in the radial direction, the one-side inclined region extending while inclining to one side in the tire circumferential direction, the other-side inclined region extending while inclining to the other side in the tire circumferential direction, the one-side inclined region including a minimum angle position Q1 within the core lower surface opposing region in which a cord angle $\alpha$ of the carcass cords with respect to the tire circumferential direction becomes a minimum value $\alpha 1$ min, and the cord angle $\alpha$ increasing from the minimum angle position Q1 in approaching the ply main body side and the inflection R0, the other-side inclined region including a minimum angle position Q2 between the inflection R0 and the tip end Pa of the ply lapelled portion in which the cord angle $\alpha$ becomes a minimum value $\alpha 2$ min, and the cord angle $\alpha$ increasing from the minimum angle position Q2 in approaching the inflection R0 and the tip end Pa of the ply lapelled portion.

The present invention also includes a heavy duty radial tire comprising a carcass ply in which a carcass ply main body that extends from a tread portion over side wall portions up to bead cores of bead portions and ply lapelled portions that are lapelled from inside to outside in the tire axial direction around the bead cores, wherein each ply lapelled portion comprising of a main portion and a winding portion, the main portion being bent along an inner surface in the tire axial direction, a lower surface in the radial direction and an outer surface in the tire axial direction of the bead core, the winding portion continuing from the main portion and extending towards the ply main body portion along a top surface of the bead core in the radial direction or upon separating from the top surface thereof in the radial direction at an angle that is smaller than 90 degrees, and the bead portion comprising a bead reinforcing layer in which reinforcing cords are aligned, wherein the bead reinforcing layer includes a curved portion that faces along the main portion of the ply lapelled portion and inside thereof in the radial direction, an outer piece outside of the curved portion in the tire axial direction and that inclines outside in the tire axial direction towards outside in the radial direction upon separating from the main portion, and an inner piece that extends inside of the curved portion in the tire axial direction along the inner surface of the ply main body portion in the tire axial direction, and wherein in a cord angle curve Y=f(X) when a length along the bead reinforcing layer from a tip end Qo of the outer piece to a tip end Qi of the inner piece of the bead reinforcing layer is defined as X and a cord angle of the reinforcing cords with respect to the tire circumferential direction at a position of the length X is defined as Y, the cord angle curve f(X) includes at least three inflections R, that is, a second inflection R2 at which the cord angle Y becomes a minimum value Ymin, and first and third inflections R1, R3 on both sides thereof, a differential coefficient f'(X) of the cord angle curve f(X) being positive between the tip end Qo and the first inflection R1, a differential coefficient f'(X) between the first and second inflections R1, R2 being negative, and a differential coefficient f'(X) between the second and third inflections R2, R3 being positive, and wherein the second inflection R2 is positioned between a core bottom point at which a line, which passes through a center of gravity point G of the bead core and which is perpendicular to the lower surface in the radial direction, intersects with the bead reinforcing layer, and a core inner end opposing point at which a line, which passes through an inner end of the bead core in the tire axial direction and which is parallel to the loser surface in the radial direction, intersects with the bead reinforcing layer.

The present invention includes a heavy duty radial tire comprising a carcass ply in which a carcass ply main body that extends from a tread portion over side wall portions up to bead cores of bead portions and ply lapelled portions that are lapelled from inside to outside in the tire axial direction around the bead cores, wherein each ply lapelled portion is comprised of a main portion and a winding portion, the main portion being bent along an inner surface in the tire axial direction, a lower surface in the radial direction and an outer surface in the tire axial direction of the bead core, the winding portion continuing from the main portion and extending towards the ply main body portion upon contacting a top surface of the bead core in the radial direction or upon separating from the top surface thereof in the radial direction at an angle that is smaller than 90 degrees, and the bead portion comprising a bead reinforcing layer in which reinforcing cords are aligned, wherein the bead reinforcing layer includes a curved portion that faces along the main portion of the ply lapelled portion and inside thereof in the radial direction, an outer piece outside of the curved portion in the tire axial direction and that inclines outside in the tire axial direction towards outside in the radial direction upon separating from the main portion, and an inner piece that extends inside of the curved portion in the tire axial direction along the inner surface of the ply main body portion in the tire axial direction, and wherein in a cord aligning density curve D=g(X) when a length along the bead reinforcing layer in a direction from a tip end Qo of the outer piece to a tip end Qi of the inner piece of the bead reinforcing layer is defined as X and a cord aligning density of the reinforcing cords at the position of length X is defined as D, the cord aligning density curve g(X) includes at least three inflections R, that is, a second inflection R2 at which the cord aligning density D becomes a maximum value Dmax, and first and third inflections R1, R3 on both sides thereof, a differential coefficient g'(X) of the cord aligning density curve g(X) being negative between the tip end Qo and the first inflection R1, a differential coefficient g'(X) between the first and second inflections R1, R2 being positive, and a differential coefficient g'(X) between the second and third inflections R2, R3 being negative, and wherein the second inflection P2 is positioned between a core, bottom point at which a line, which passes through a center of gravity point G of the bead core and which is perpendicular to the lower surface in the radial direction, intersects with the bead reinforcing layer and a core inner end opposing point at which a line, which passes through an inner end of the bead core in the tire axial direction and which is parallel to the lower surface in t

DESCRIPTION OF THE PREFERRED EMBODIMENTS

In the present descriptions, dimensions of respective parts of a tire are values that are specified when the tire is assembled to a normal rim and when it is in a 50 kPa filled condition with an internal pressure of 50 kPa being filled therein, unless stated otherwise. In this respect, the term "normal rim" denotes a rim with standards being defined for each tire within standardizing systems including standards on which the tires are based, such concretely being an ordinary rim according to JATMA, a "design rim" according to TRA and a "measuring rim" according to ETRTO.

One embodiment of the present invention will now be explained.

Figure 1:
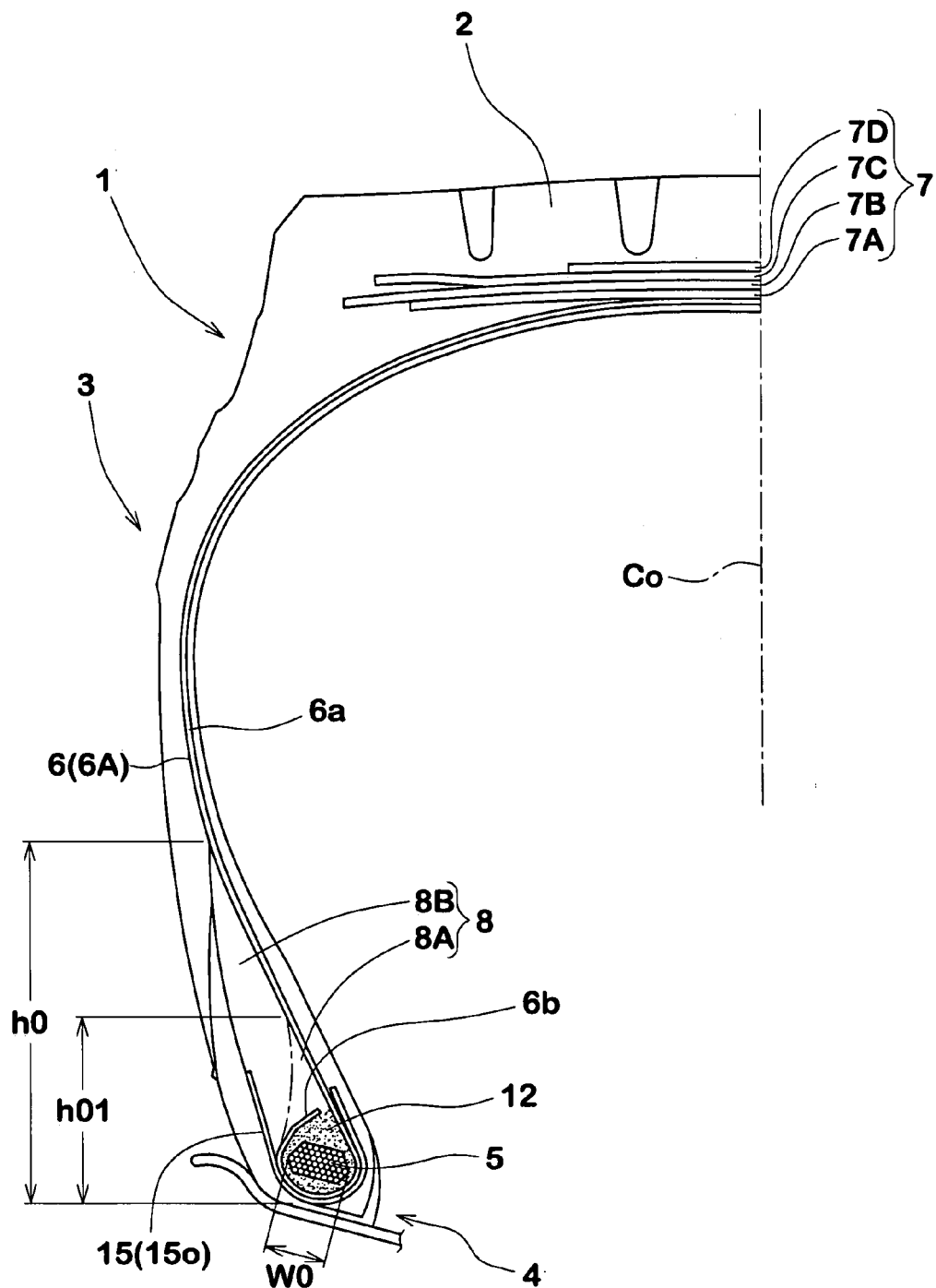
FIG. 1 is a sectional view illustrating one embodiment of the heavy duty radial tire according to the present invention.
Figure 2:
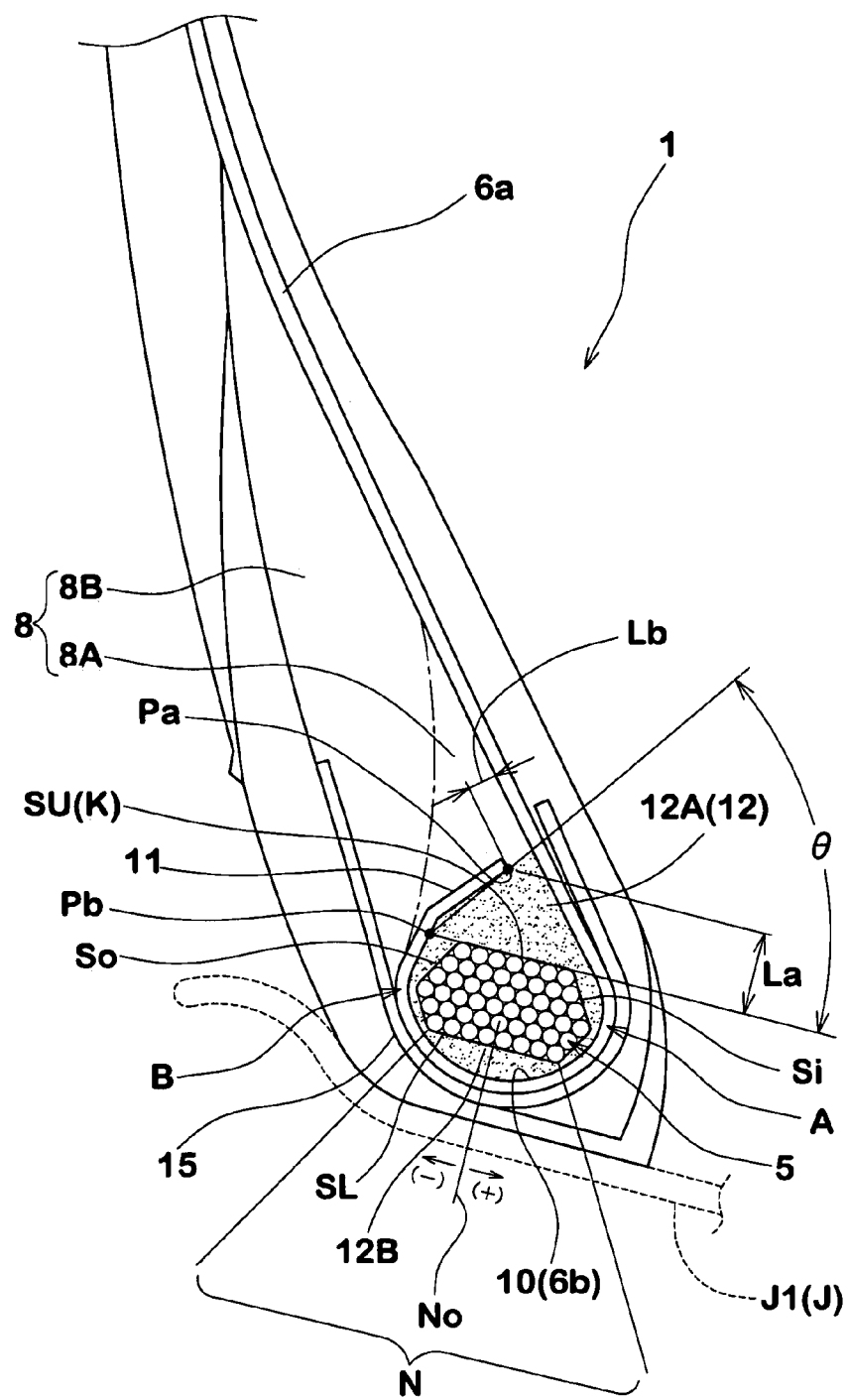
FIG. 2 is a sectional view illustrating a bead portion thereof in enlarged form.
Figure 3:
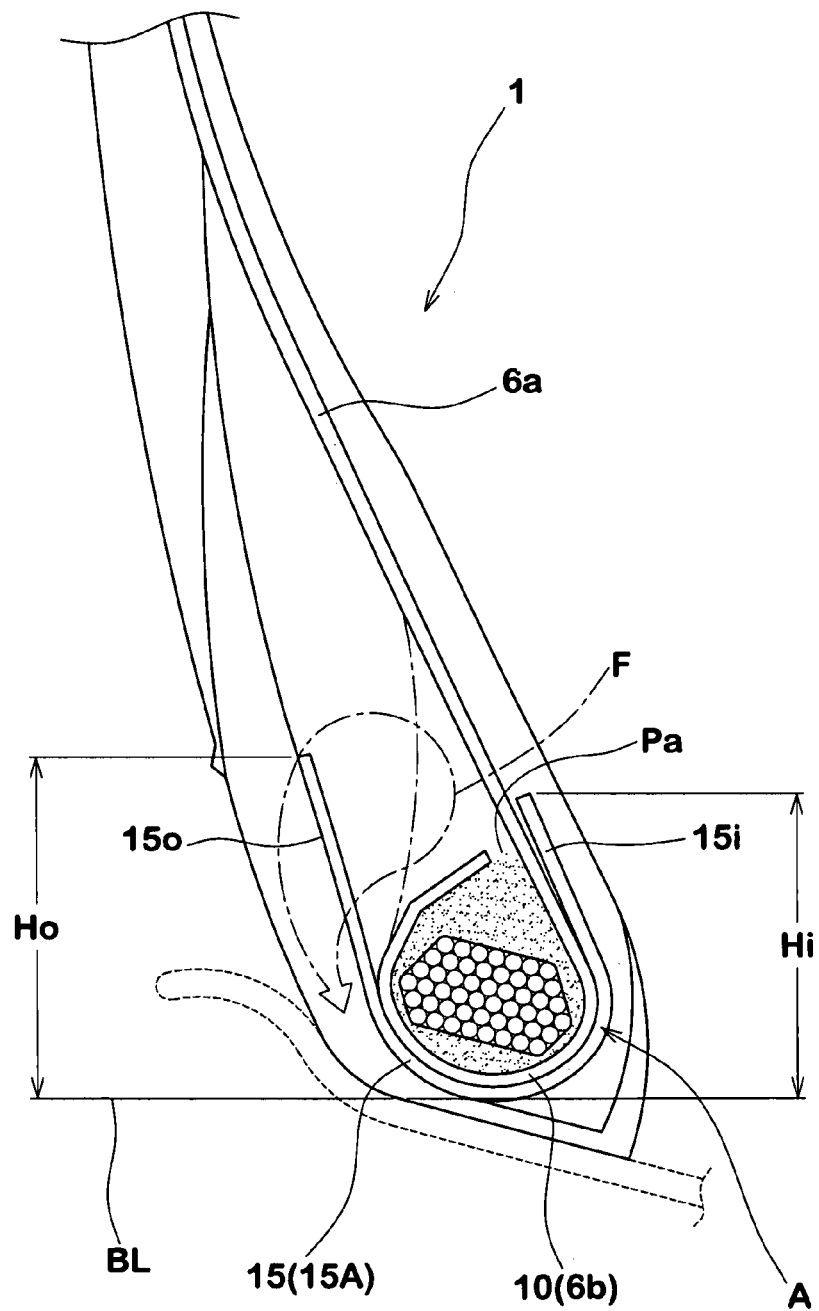
FIG. 3 is a sectional view illustrating the bead portion thereof in enlarged form.

FIG. 1 is a sectional view illustrating a 50 kpa filled condition of the heavy duty radial tire according to the present invention, and FIGS. 2 and 3 are sectional views illustrating a bead portion thereof in enlarged form.

In FIG. 1, the heavy duty radial tire 1 comprises a carcass 6 that extends from a tread portion 2 over sidewall portions 3 up to bead cores 5 of bead portions 4, and a belt layer 7 that is disposed outside of the carcass 6 in the radial direction and inward of the tread portion 2.

The belt layer 7 is formed of at least two (usually more than three in case of a heavy duty radial tire) belt plies employing belt cords made of steel. The present example illustrates a case in which the belt layer 7 is of a four-piece structure comprised of a first belt ply 7A on an innermost side in the radial direction in which belt cords are aligned at an angle of, for instance, 60±15 in the tire circumferential direction and second to fourth belt plies 7B to 7D in which belt cords are aligned at a small angle of, for instance, 10 to 35 in the tire circumferential direction. The belt plies 7A to 7D serve to increase the belt rigidity and to reinforce the tread portion 2 through hoop effects by providing plies in which belt cords mutually intersect.

The carcass 6 is comprised of a single carcass ply 6A in which carcass cords of steel are aligned at an angle of 85 to 90 degrees in the tire circumferential direction. The carcass ply 6A comprises a ply main body portion 6a that extends from the tread portion 2 and the side wall portions 3 to bridge between the bead cores 5, 5, and ply lapelled portions 6b that successively continue from both sides thereof and that are lapelled from inside to outside in the tire axial direction around the bead cores 5.

In this respect, each bead core 5 comprises a ring-like core main body in which bead wires, which are, for instance, bead core 5 is a flat hexagonal shape having a horizontally made of steel, are wound in a multi-staged and multiseriate manner as illustrated in FIG. 2. In the present example, the sectional shape of the bead core 5 is a shape of six square shapes of long width. Since the bead core 5 is arranged in that a lower surface SL in the radial direction is substantially parallel to a rim sheet J1 of a normal rim J, the fitting force with the rim is improved over a large area. The present example illustrates a case in which the normal rim J is a 15 tapered rim for a tubeless tire. Accordingly, the lower surface SL and the top surface SU of the bead core 5 in the radial direction are inclined at an angle of substantially 15 with respect to a line in the tire axial direction. The sectional shape of the bead cores 5 may also be orthohexagonal or rectangular according to needs.

Next, according to the present invention, each ply lapelled portion 6b of the carcass 6 is wound around the bead core 5 while its tip end portion is pinched between and engaged at the bead apex rubber 8 to thus comprise a so-called bead-wind structure.

More particularly, the ply lapelled portion 6b comprises a main portion 10 that is bent along an inside surface Si of the bead core 5 in the tire axial direction, the lower surface SL in the radial direction thereof and an outside surface so in the tire axial direction. It further comprises a winding portion 11 of a small length that continues to the main portion 10 and that extends while contacting or separating from the top surface SU of the bead core 5 in the radial direction.

The present embodiment illustrates a case in which the winding portion 11 separates from the top surface SU of the bead core 5. The winding portion 11 inclines towards the ply main body portion 6a at an angle θ that is smaller than 90 degrees and preferably not more than 75 degrees with respect to the top surface SU in the radial direction. The winding portion 11 denotes a portion that is located outside in the radial direction than an extension of the top surface SU. While the present embodiment illustrates a case in which the winding portion 11 assumes a bent linear shape that is bent in a substantially L-shaped manner, it may also be straight-linear or of warped shape such as a arc-like shape.

Figure 4:
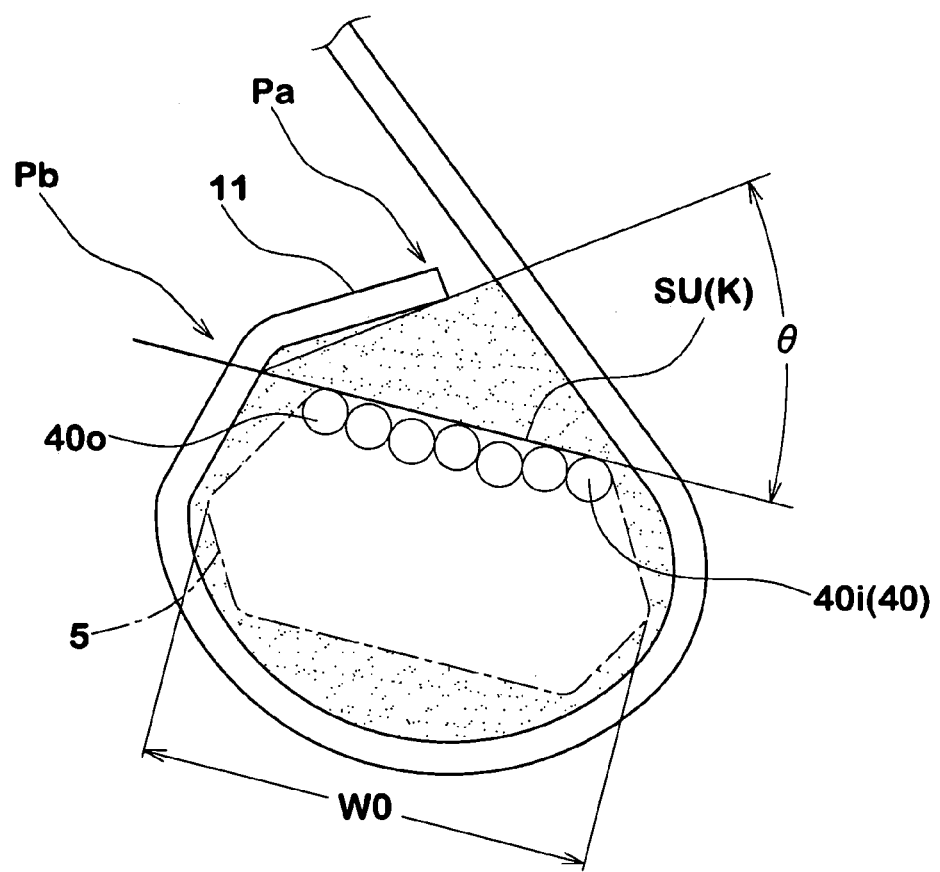
FIG. 4 is a diagram for explaining a definition of a top surface of a bead core when a top surface in the radial direction comprises a non-planar surface.

In this respect, it may be that the bead core 5 has a top surface SU in the radial direction that forms a non-planar surface in which the bead wires 40 are aligned not in a linearly arranged order but upon varying in vertical directions as illustrated in FIG. 4. In such a case, the top surface SU in the radial direction is defined as a tangential line K from among the bead wire rows (upper rows) comprising the top surface SU that contacts a bead wire 40o that is located on the outermost side in the tire axial direction and a bead wire 40i that is located on the innermost side in the tire axial direction. When the winding portion 11 is of curved shape such as a bent shape or a warped shape, the angle θ is defined as an angle that a straight line that connects a lower end Pb of the winding portion 11 at which the winding portion 11 that intersects an extension of the top surface SU in the radial direction (when the top surface SU in the radial direction is non-planar, the tangential line K) and a tip end Pa of the winding portion 11 forms with respect to the top surface SU in the radial direction.

A height La of the tip end Pa of the winding portion 11 from the top surface SU (when the top surface SU in the radial direction is non-planar, the tangential line K) in the radial direction is defined to be 5 to 12 mm. Further, soft filler rubber 12 is disposed at regions including a region formed between the winding portion 11 and the top surface SU.

The present embodiment illustrates a preferred case in which the filler rubber 12 is comprised of a base portion 12A having a substantially triangular section disposed between the top surface SU of the bead core 5, the winding portion 11 and the ply main body portion 6a, and a relatively thin film-like sub-portion 12B that is disposed between the inner surface Si of the bead core 5 in the tire axial direction, the lower surface SL in the radial direction, the outer surface So in the tire axial direction, and the main portion 10 of the ply lapelled portion 6b. In this respect, it is possible to comprise the filler rubber 12 of the base portion 12A only.

Like this, the filler rubber 12 includes the base portion 12A with a substantially triangular section, the height La of 5 mm to 12 mm. It is consequently possible to reduce the degree of bending of the winding portion 11, and it is possible to restrict strong return-bending (so-called spring-back) that may be caused, for instance, during raw tire molding processes. It is further possible to restrict occurrence of deficient moldings such as air residues that originate therefrom. Where the height La is less than 5 mm, spring-back cannot be sufficiently restricted and the impact that the tip end Pa receives when grounding will become large so that damages are apt to occur at the tip end Pa. On the other hand, when the height La exceeds 12 mm, stress at the time of deformation of the tire tends to be strongly applied to the tip end Paso that damages are apt to occur at the tip end Pa.

For the purpose of further easing stress and impact acting on the tip end Pa, the present embodiment is arranged in that the filler rubber 12 is comprised of rubber having a low elasticity with a complex elastic modulus Ea* ranging from 2 to 25 MPa that exhibits superior impact easing effects. Values for the complex elastic moduli are those that have been obtained using a visco elastic spectrometer under conditions in which the temperature is 70 C, the frequency 10 Hz and the dynamic strain rate 2%. When the complex elastic modulus E1* exceeds 25 MPa, the flexibility will become inferior so that effects of easing oscillation and stress cannot be sufficiently exhibited.

A clearance Lb between the tip end Pa and the ply main body portion 6a is preferably secured to be 1 to 5 mm. When the clearance Lb is less than 1 mm, tip ends of carcass cords and carcass cords of the ply main body portion 6a are apt to come into contact owing to variations caused during molding of the tire or deformation of the tire during running. Damages of the cords such as fretting are easily provoked through rasping or the like. When the clearance Lb exceeds 5 mm, the engaging force of the winding portion 11 will become insufficient so that it will bring about disadvantages in view of blow-by.

Figure 5:
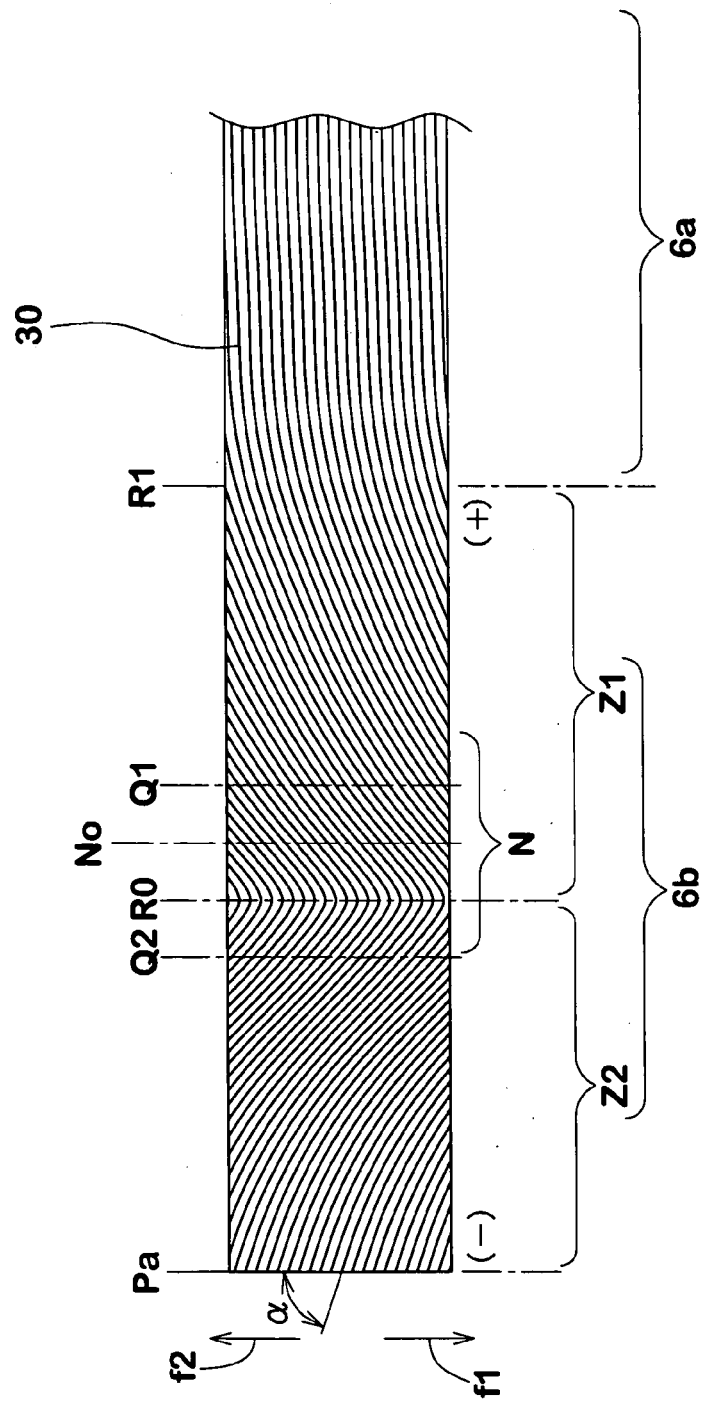
FIG. 5 is an expansion view illustrating an aligned condition of carcass cords with a ply lapelled portion being exploded in a planar form.
Figure 6:
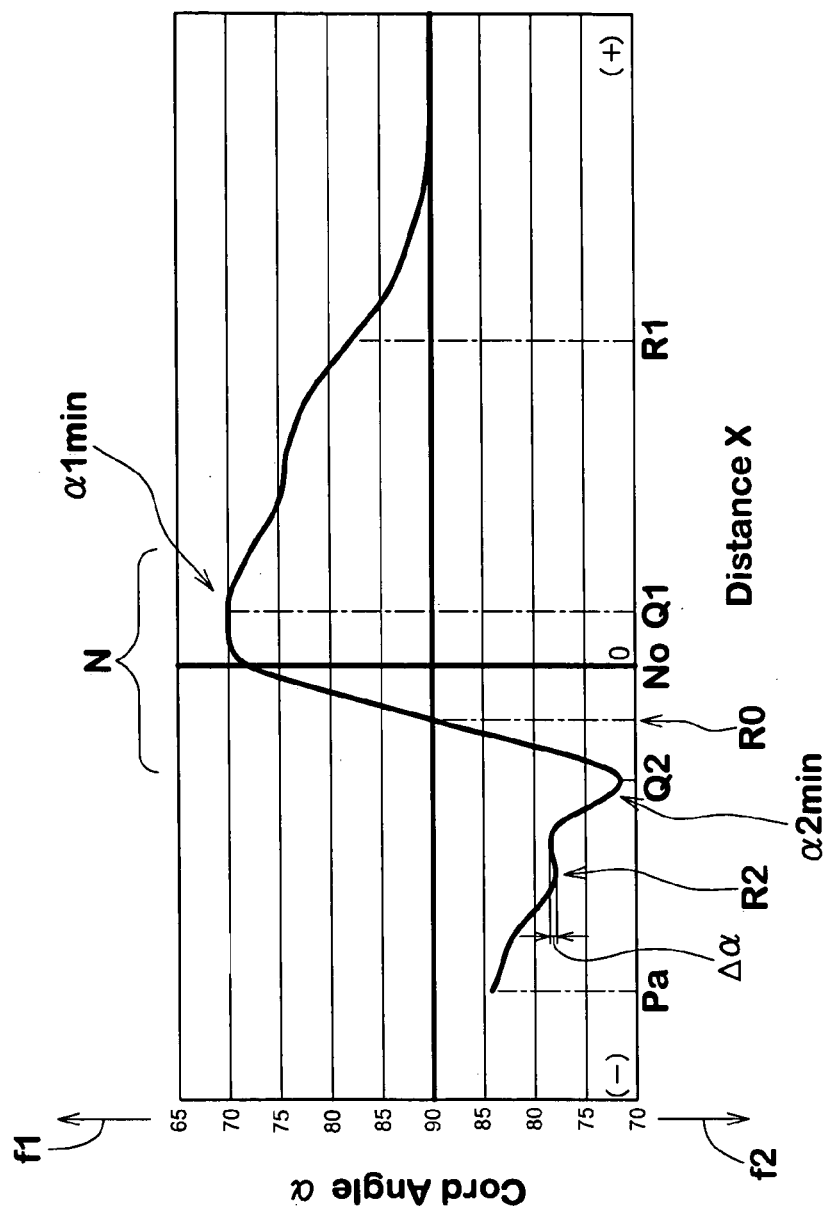
FIG. 6 is a diagram illustrating a cord angle curve with a distance X in the radial direction along the ply from a central position of a core lower surface opposing region of the ply lapelled portion being oriented along the abscissas while a cord angle α with respect to the carcass cords in the tire circumferential direction at the position of distance X being oriented along ordinate Y.

The present embodiment is arranged in that the ply lapelled portions 6b have a cord aligned condition as illustrated in FIGS. 5 and 6 in such a bead-wind structure. With this arrangement, the engaging force of the ply lapelled portions 6b is improved and damages owing to blow-by or shifts in blow-by directions are restricted.

Here, FIG. 5 is a expansion view illustrating an aligned condition of the carcass cords 30 with the ply lapelled portion 6b being exploded in a planar form. In FIGS. 5 and 6, region N denotes a region in which the ply lapelled portion 6b faces towards the lower surface SL of the bead core 5 in the radial direction as illustrated in FIG. 2. That is, the region N is called as core lower surface opposing region. More particularly, this is a region between intersections in which lines that pass through both end points of the lower surface SL in the radial direction and that is perpendicular to the ply lapelled portion 6b intersect with the ply lapelled portion 6b. The region N is referred as a core lower surface opposing region N. In FIG. 6, a distance X of the ply lapelled portion 6b in the radial direction from a central position No of a core lower surface opposing region N along the ply (wherein the ply main body portion 6a side is indicated as +, while the tip end Pa side is indicated as −) is oriented along the abscissa. A cord angle α of the carcass cords 30 in the tire circumferential direction at the position of the distance X is oriented along the ordinate Y. A cord angle curve of such a case is shown in FIG. 6.

More particularly, as illustrated in FIGS. 5 and 6, the ply lapelled portion 6b includes one-side inclined region Z1 in which the carcass cords 30 extends up to an inflection R0 while inclining to one side f1 in the tire circumferential direction. It further includes the other-side inclined region Z2 that extends from the inflection R0 towards the tip end Pa, at the other side f2 in the tire circumferential direction.

The carcass cords 30 are accordingly warped in a trough-like manner in which it comprises an inflection R0 at a boundary point between the one-side inclined region Z1 and the other-side inclined region Z2 at which inclining directions of the carcass cords 30 are changed from one side f1 to the other side f2 in the tire circumferential direction. In this respect, as illustrated in FIG. 5, the inflection R0 portion is formed as an arc-like portion in which the inflection R0 comprises a trough bottom. With this arrangement, the one side inclined region Z1 and the other side inclined region Z2 continue into each other with the arc-like portion being interposed.

At this time, the inflection R0 is located within the core lower surface opposing region N. Moreover, the one-side inclined region Z1 includes a minimum angle position Q1 at which the cord angle α becomes a minimum value α1 min within the core lower surface opposing region N. The carcass cords 30 are respectively arranged in that the cord angle α increases in approaching from the minimum angle position Q1 to the inflection R0 and from the minimum angle position Q1 to an end R of the ply lapelled portion 6b on the ply main body portion side. Further, the other-side inclined region Z2 includes a minimum angle position Q2 between the inflection R0 and the tip end Pa at which the cord angle α becomes a minimum value α2 min. Accordingly, the carcass cords 30 are arranged in that the cord angle α increases in approaching from the minimum angle position Q2 to the inflection R0 and from the minimum angle position Q2 to the tip end Pa. In this respect, while the carcass cords 30 may include minutely reduced portions R2 between either at least one of a region between Q1 and R1, between Q1 and R0, between Q2 and R0, and between Q2 and Pa at which the cord angle α partially reduces in a range Dα that is not more than 5 degrees and preferably not more than 3 degrees (as illustrated in FIG. 6), it is desirable that the cord angle α is gradually increased in the respective regions without including any reduced portions R2.

Since the ply lapelled portions 6b are accordingly arranged in that the carcass cords 30 are warped in a S-shaped manner and in that the arc-like portions are trough-like, it is possible to increase the length of cords that are wound around the bead cores 5 when compared to straight-linear ones. Moreover, since drag in a direction of pulling the cords out can be increased, the engaging force to the ply lapelled portions 6b can be further improved together with the increase in cord length so that damages at the position A owing to blow-by or shifts in blow-by directions can be effectively restricted.

For this purpose, the minimum values α1 min, α2 min are preferably set in a range of 60 to 80 degrees, respectively, and it will be difficult to sufficiently secure effects of improving the engaging force when the angles exceed 80 degrees. In this respect, when the minimum values α1 min, α2 min become smaller than 60 degrees, cord intervals become excessively small so that fretting tends to be generated at the carcass cords 30. The minimum angle position Q2 is positioned within the main portion 10 of the ply lapelled portion 6b and particularly closer to the ply main body portion 6a side than the outer end position B of the bead core 5 in the tire axial direction (as illustrated in FIG. 2). With this arrangement, effects of improving engaging force can be increased. In this respect, a difference between the cord angle α0 (in the embodiment α0 is 90 degrees) on the tire equator Co and the minimum values α1 min, α2 min is preferably not less than 10 degrees.

Figure 7:
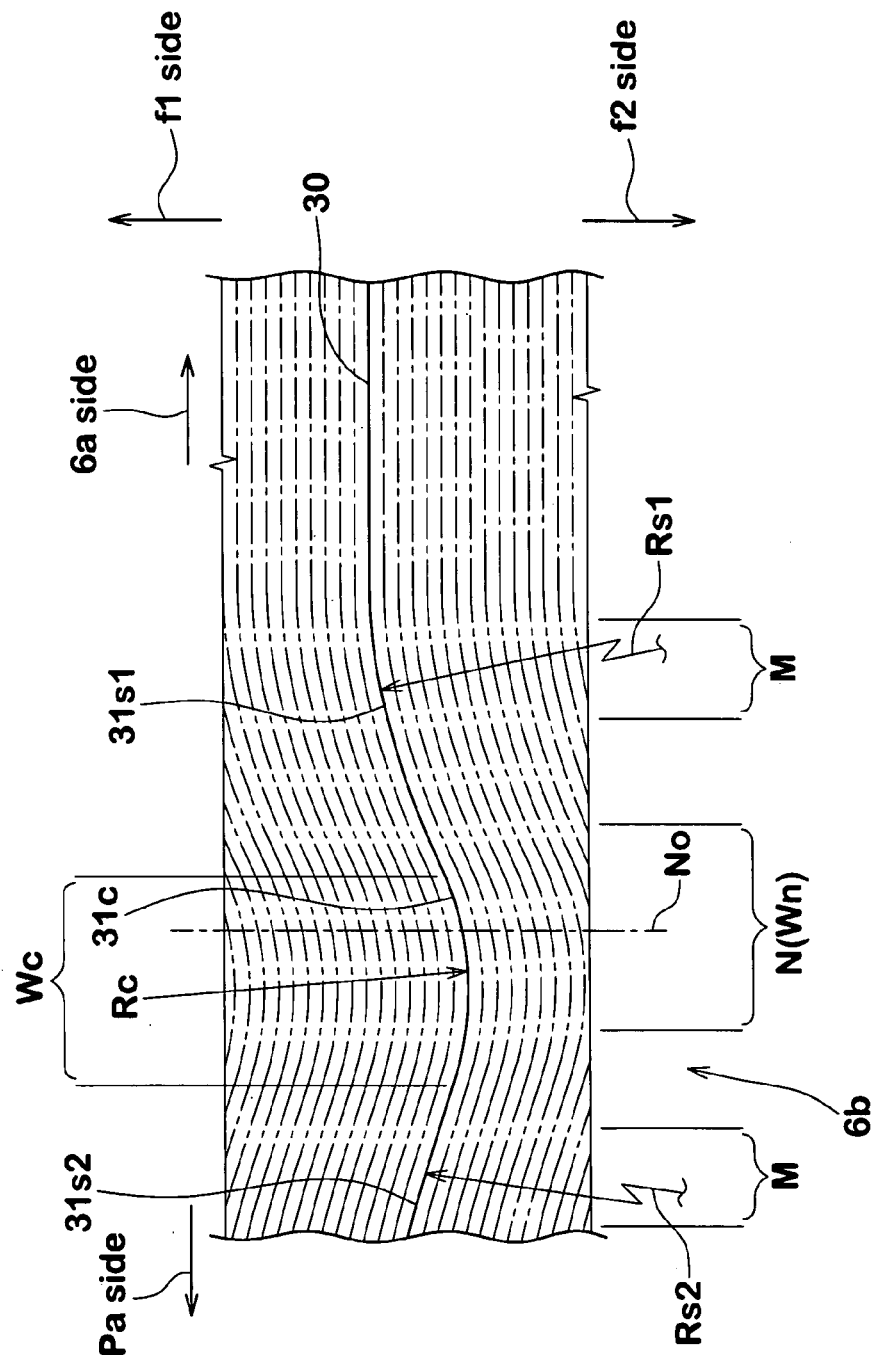
FIG. 7 is an expansion view illustrating an aligned condition of carcass cords with a ply lapelled portion being exploded in a planar form.
Figure 8:
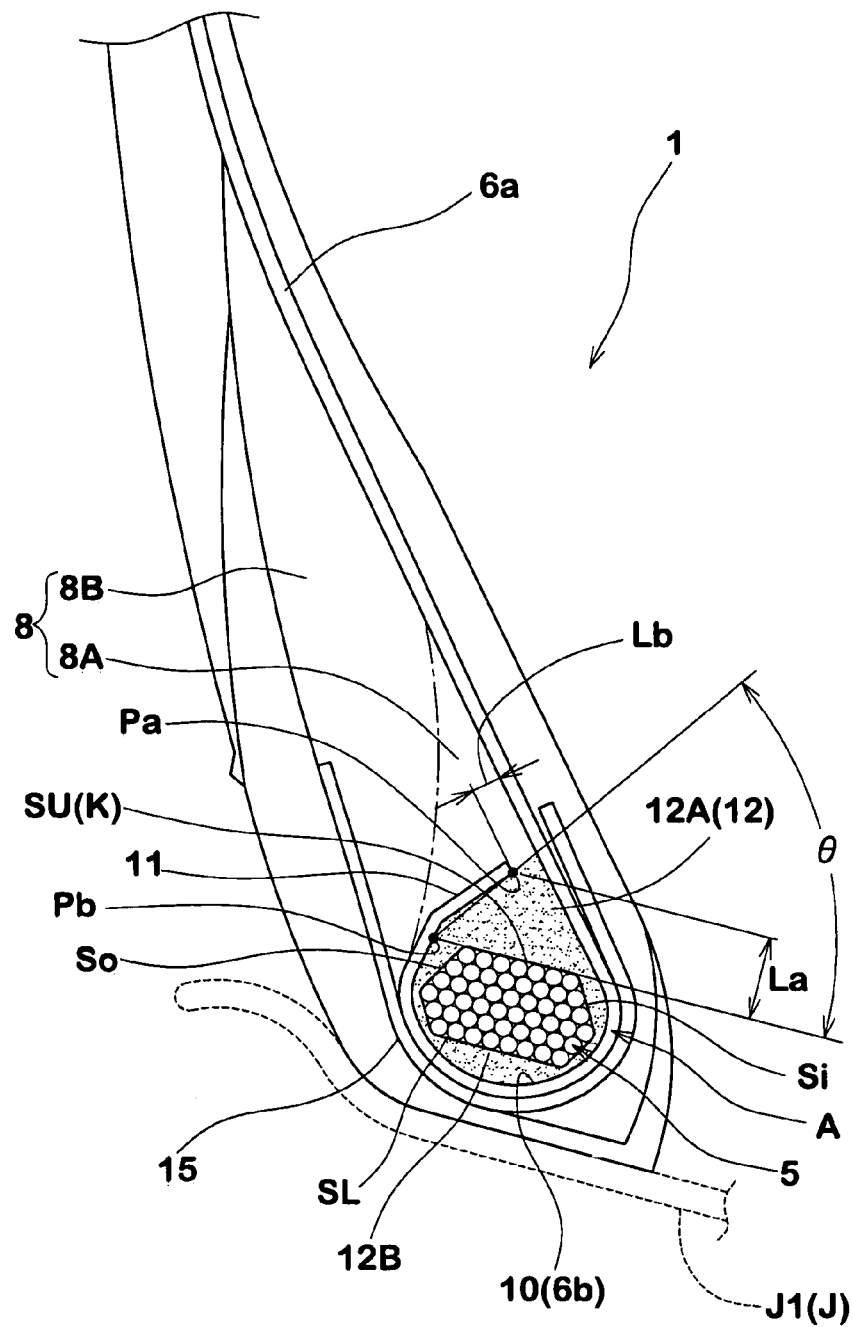
FIG. 8 is a sectional view illustrating a bead portion thereof in enlarged form.

FIG. 7 illustrates another embodiment. FIG. 7 is an expansion view illustrating an aligned condition of carcass cords 30 with the ply lapelled portion 6b being exploded in a planar form.

More particularly, as illustrated in FIG. 7, the carcass cords 30 of the ply lapelled portion 6b are comprised of a central arc-like portion 31c, a one-side inclined region 31s1 having a radius of curvature Rs1, and the other-side inclined region 31s2 having a radius of curvature Rs2. The central arc-like portion 31c is an arc-like portion having a radius of curvature Rc with a center thereof being located on the one side f1 in the tire circumferential direction. The one-end inclined region 31s1 is comprised of an arc-like portion with a radius of curvature Rs1 that smoothly continues into the central arc-like portion 31c on the ply main body portion 6a side and with a center thereof being located on the other side f2 in the tire circumferential direction. The other-end inclined region 31s2 is comprised of an arc-like portion with a radius of curvature Rs2 that smoothly continues into the central arc-like portion 31c on the tip end Pa side of the winding portion 11 and with a center thereof being located on the other side f2 in the tire circumferential direction. The central arc-like portion 31c, the one side inclined region 31s1 having a radius of curvature Rs1, and the other side inclined region 31s2 having a radius of curvature Rs2 are warped, for instance, in a trough-like manner.

Since the ply lapelled portions 6b are arranged in that the carcass cords 30 are warped in a wave-like form, it is possible to increase the length of cords that are wound around the bead cores 5 when compared to straight-linear ones. Moreover, the drag in a direction of pulling the cords out can be further improved through the wave-like warps. Thanks to the synergy effect of both, the engaging force to the ply lapelled portions 6b can be further improved, and damages at the inner end positions A owing to blow-by or shifts in blow-by directions can be effectively restricted.

At this time, reducing the radius of curvature Rc of the central arc-like portion 31c will advantageously function to increase the cord length around the bead core, and disposing the central arc-like portion 31c downward of the core, which is strongly fitted with the rim, will be preferable in exhibiting high engaging force.

Accordingly, the present embodiment is arranged in that the radius of curvature Rc of the central arc-like portion 31c is set to not more than 100 mm and thus small. The central arc-like portion 31c is disposed in the core lower surface opposing region N in which the ply lapelled portion 6b faces towards the lower surface SL of the bead core 5 in the radial direction (as illustrated in FIG. 2). In this respect, it will be suffice if the central arc-like portion 31c is disposed in a part of the core lower surface opposing region N. It is further desirable the central arc-like portion 31c occupies not less than 20%, and further not less than 40%, and more desirably not less than 60% of a width Wn of the core lower surface opposing region N. A width Wc of the central arc-like portion 31c is preferably 20 to 150%, more preferably 40 to 100% of a core width W0 (as illustrated in FIG. 1) of the bead core 5. In this respect, it is also possible to dispose the central arc-like portion 31c such that the core lower surface opposing region N extends beyond to the ply main body portion 6a side and/or to the tip end Pa side. In this respect, a side region M is defined to be an area in which a distance from the core lower surface opposing region N in the radial direction along the ply lapelled portion 6b is in the range of 10 mm to 20 mm. It is preferable to comprise the entire region of the side region M of the one-side and the other-side inclined regions 31s1, 31s2 in view of forming well-balanced wave-like warps.

The present embodiment is arranged in that the radius of curvature Rs1 of the one-side inclined region 31s1 is larger than 100 mm and not more than 300 mm for the purpose of achieving increases in cord length while maintaining the balance of the warps. Also, the radius of curvature Rs2 of the other-side inclined region 31s2 is set to be not less than 500 mm and not more than 1500 mm.

When the radius of curvature Rc exceeds 100 mm, it will become difficult to sufficiently increase the cord length. In this respect, when the radius of curvature Rc becomes smaller than 10 mm, ends (cord aligning density) will become dense so that inconveniences are caused in that fretting is caused between adjoining cords, and it is accordingly preferably to set a lower limit value thereof to not less than 10 mm.

When the radius of curvature RS1 becomes larger than 300 mm and when the radius of curvature Rs2 becomes larger than 1500 mm, increases in the cord length will become insufficient. Further, when the radius of curvature Rs1 becomes not more than 100 mm and when the radius of curvature Rs2 is less than 500 mm, the ends (cord numbers per 50 mm) will become dense and fretting tends to occur.

In this respect, for avoiding cases in which ends become excessively dense, the radius of curvature Rs2 is set to be larger than RS1.

In this respect, it is possible to arrange the ply lapelled portion 6b such that straight-linear portions in which the carcass cords 30 extend in a substantially linear manner are interposed between the central arc-like portion 31c and the one side inclined region 31s1 and/or between the same and the other side inclined region 31s2.

In the embodiment as illustrated in FIGS. 1 to 7, there is provided a bead reinforcing layer 15 at the bead portion 4 for the purpose of further restricting damages at the position A. The bead reinforcing layer 15 is comprised of a cord ply in which steel cords are aligned upon inclining the same at an angle of 10 to 40 with respect to a tire circumferential line. Further, as illustrated in FIG. 3, it further comprises at least a curved portion 15A that faces along the main portion 10 of the ply lapelled portion 6b and that extends inward thereof in the radial direction, and an outer piece 15o outside of the curved portion 15A in the tire axial direction that inclines outside in the tire axial direction towards outside in the radial direction to separate from the main portion 10. The present embodiment illustrates a preferable case in which an inner piece 15i is provided to continue from the curved portion 15A inside thereof in the tire axial direction that extends along the inner surface of the ply main body portion 6a in the tire axial direction.

As mentioned above, major reasons for damages at position A are shifts of the ply lapelled portion 6b in the blow-by direction. Such damages remarkably occur in the presence of thermal softening of rubber when the temperature of the bead portion 4 has excessively increased upon catching heat of the vehicle side, for instance, the brake pads. More particularly, thermally softened rubber inside of the bead will be pressed between the same and the flange when load is applied thereto such that rubber tends to move to the bead toe side. At this time, the ply lapelled portion 6b is dragged by such movement so as to promote shifts in blow-by directions.

When a height Ho in the radial direction of the outer piece 15o becomes not less than 10 mm and preferably not less than 20 mm, it will exhibit functions of a shielding plate.

With this arrangement, rubber movement F to the bead heel side (as illustrated by a one-dot chain line in FIG. 3) can be reduced through shielding effects. However, when the height Ho in the radial direction exceeds 35 mm, damages owing to focusing of stress are apt to occur at a tip end of the outer piece 15o. Further, the inner piece 15i restricts falling of the carcass ply 6A when load is applied thereto so that strain at the tip end Pa of the winding portion 11 is further reduced. Accordingly, a height Hi of the inner piece 15i in the radial direction from the bead base line BL is preferably set to not less than 10 mm and further not less than 20 mm. However, when it exceeds 60 mm, damages owing to stress concentration are apt to occur at a tip end of the inner piece 15i.

In this respect, when the complex elastic modulus Ea* of the filler rubber 12 is less than 2 Mpa, it will be too soft. As a result, the ply lapelled portion 6b tends to be easily dragged by the rubber movement F so that it will be disadvantageous in view of damages at position A. Accordingly, a lower limit value of the complex elastic modulus Ea* is preferably set to be larger than 3 Mpa, and further larger than 8 Mpa, and still further larger than 13 Mpa. The filler rubber 12 is desirably comprised of high sulfur-blended rubber having a blending quantity of sulfur as a vulcanizing agent of not less than 5.0 phr. Rubber blended with sulfur by not less than 5.0 phr will exhibit properties in that thermal softening of rubber hardly occurs when obtaining a complex elastic modulus Ea of the above range. Promotion of shifts in the ply lapelled portion 6b is accordingly restricted also when the bead temperature has excessively increased through heat of brake pads or similar. In this respect, when the blending quantity of sulfur exceeds 12 phr, vulcanization is excessively promoted so that burning of rubber is apt to occur, and adhesiveness with adjoining members may be degraded. The blending quantity of sulfur is thus preferably in the range of 5.0 to 12 phr, and the lower limit value thereof is preferably not less than 7.0 phr and the upper limit value is more preferably not more than 10 phr. In this respect, a blending quantity of sulfur of a rubber composition used for the ordinary tire different from the tire of the invention is generally 1.0 to 4.5 phr.

In this respect, the bead apex rubber 8 of the present embodiment is of double-layered structure comprised of a lower apex rubber portion 8A and an upper apex rubber portion 8B. The lower apex rubber portion 8A has a complex elastic modulus Eb1* of 35 to 60 Mpa. The upper apex rubber portion 8B adjoins the same outward thereof in the radial direction and has a complex elastic modulus Eb2* that is larger than the complex elastic modulus Ea* of the filler rubber 12 but smaller than the complex elastic modulus Eb1* of the lower apex rubber portion 8A. Particularly, the present embodiment is arranged, as illustrated in FIG. 2, in that a height h01 in the radial direction of the lower apex rubber portion 8A from the bead base line BL is in the range of 40 to 60% of the entire height h0 of the bead apex rubber 8 so as to achieve both, riding comfort and steering stability.

In FIGS. 1, 8 to 12 concerns the improvement in the reinforcing cord of the bead reinforcing layer 15, in the tire of bead-wind structure, with the similar method to the aforesaid carcass ply. A cord angle curve Y=f(X) in which a cord angle with respect to the reinforcing cords in the tire circumferential direction is defined as Y and a cord aligning density curve D=g(X) in which a cord aligning density of the reinforcing cords is defined as D are specified values. With this arrangement, it is aimed to achieve improvements in the lapelled structure and improvements in bead durability while achieving a light-weighted structure. Accordingly, this invention may be deemed to be an invention that falls into the same category as the above-described invention related to carcass cords. In this respect, explanations of the carcass, the bead apex or the filler rubber, that is, parts other than those of the reinforcing cords, are generally omitted in the embodiment illustrated in FIGS. 1 and 8 to 12. Arrangements of which explanations have been omitted may either be identical to those as described in the above embodiment or different therefrom.

Figure 9:
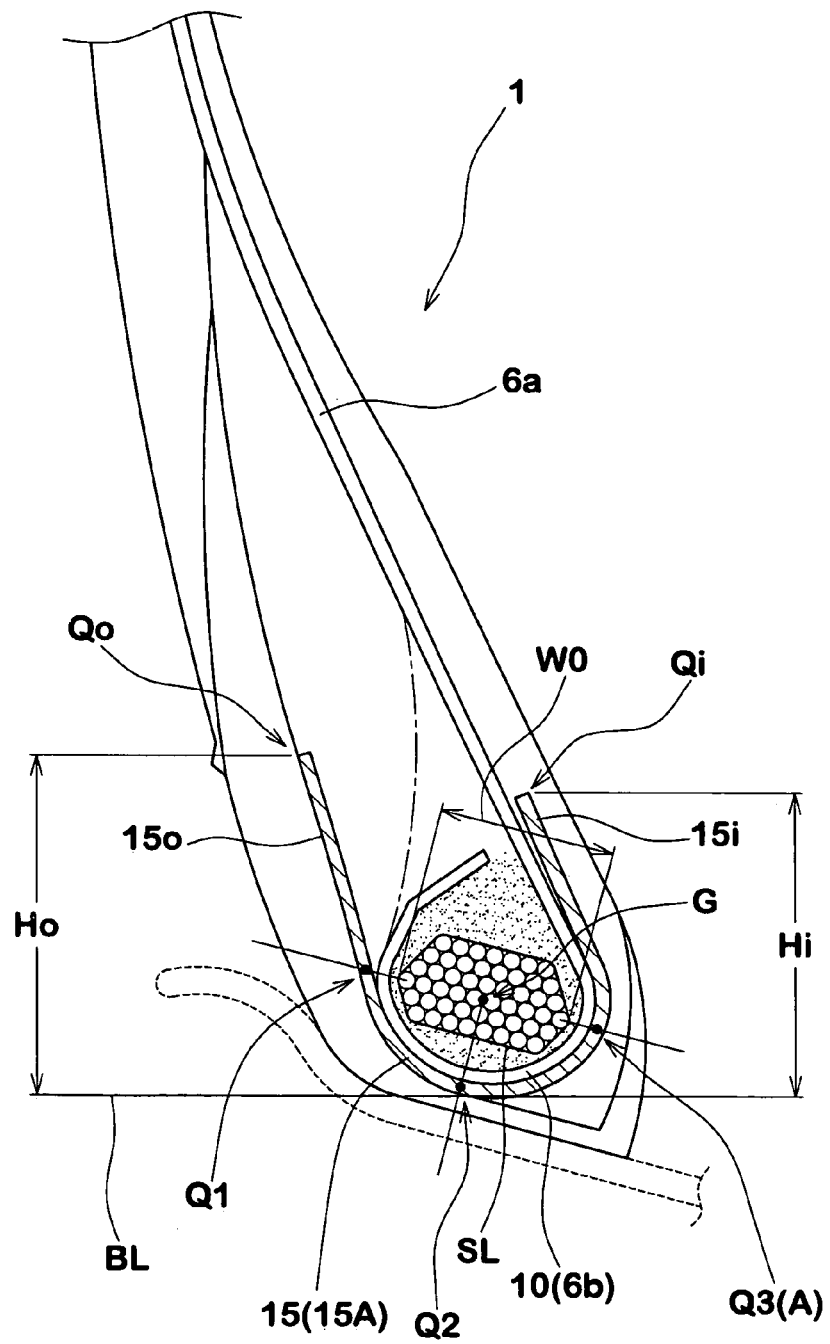
FIG. 9 is a sectional view illustrating a bead portion thereof in enlarged form.

As described above, the bead reinforcing layer 15 is comprised of a cord ply in which reinforcing steel cords are aligned. It further comprises, as illustrated in FIG. 9, the curved portion 15A that extends along the main portion 10 of the ply lapelled portion 6b inside thereof in the radial direction, the outer piece 15o outside of the curved portion 15A in the tire axial direction that inclines outside in the tire axial direction towards outside in the radial direction to separate from the main portion 10, and the inner piece 15i inside of the curved portion 15A in the tire axial direction that extends along the inner surface of the ply main body portion 6a in the tire axial direction.

For effectively restricting damages at the inner end position A while taking advantage of the light-weight arrangement of the bead-wind structure, it will be important to reinforce the inner end position A itself and to restrict collapsing(falling) of the carcass ply 6A. For reinforcement of the inner end position A itself, it will be necessary to set a low cord angle Y of the reinforcing cords with respect to the tire circumferential direction at the inner end position A. Further, for restricting collapsing of the carcass ply 6A, it will be necessary to set a low cord angle Y for the outer piece 15o and the inner piece 15i.

However, when the cord angle Y is set low in the entire region of the bead reinforcing layer 15, drawbacks are presented in that it will become difficult to perform the lapel in the shape of the letter U around the bead core and in that the workability is decreased or operations will become difficult.

Figure 10:
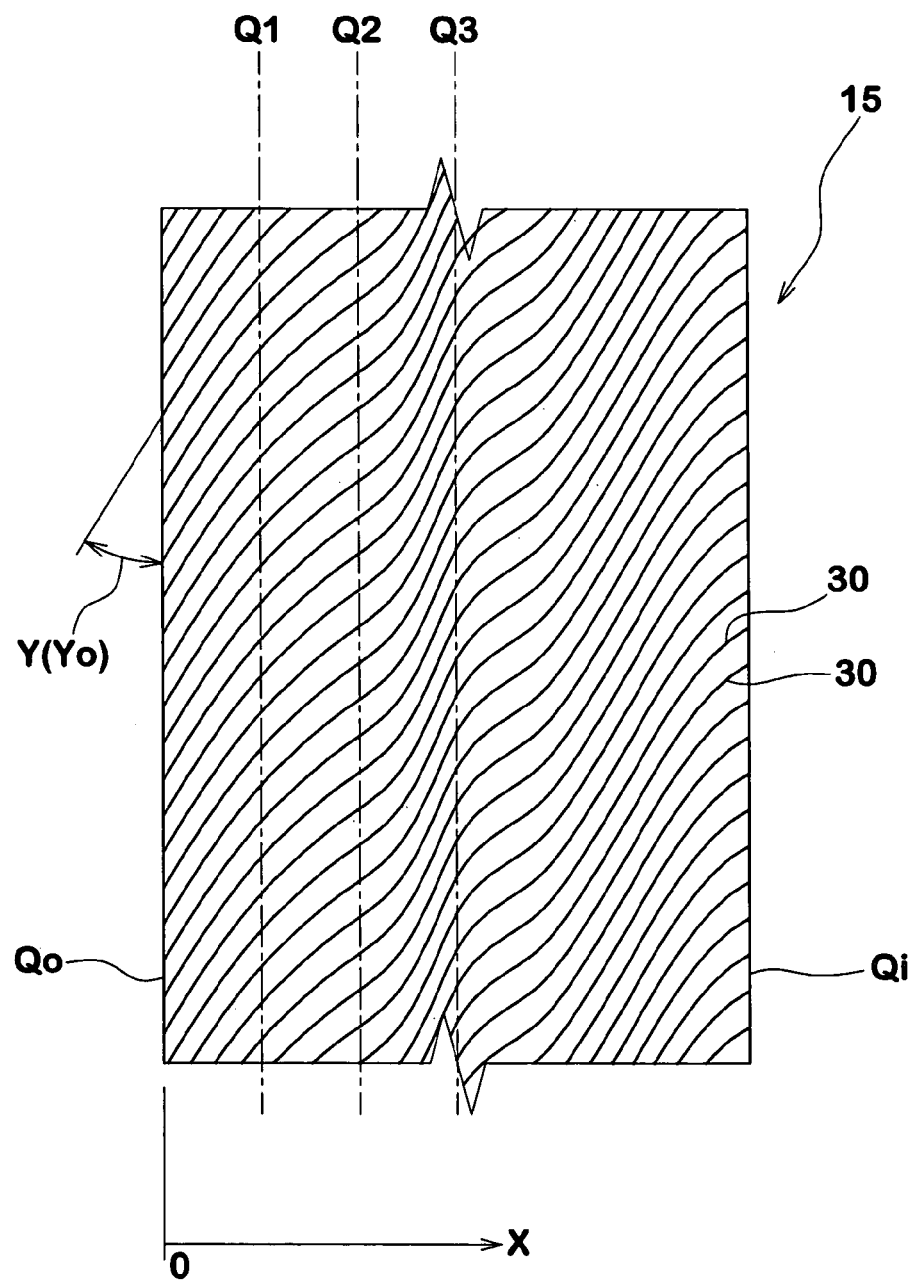
FIG. 10 is an expansion view illustrating an aligned condition of reinforcing cords with a bead reinforcing layer being exploded in a planar form.
Figure 11:
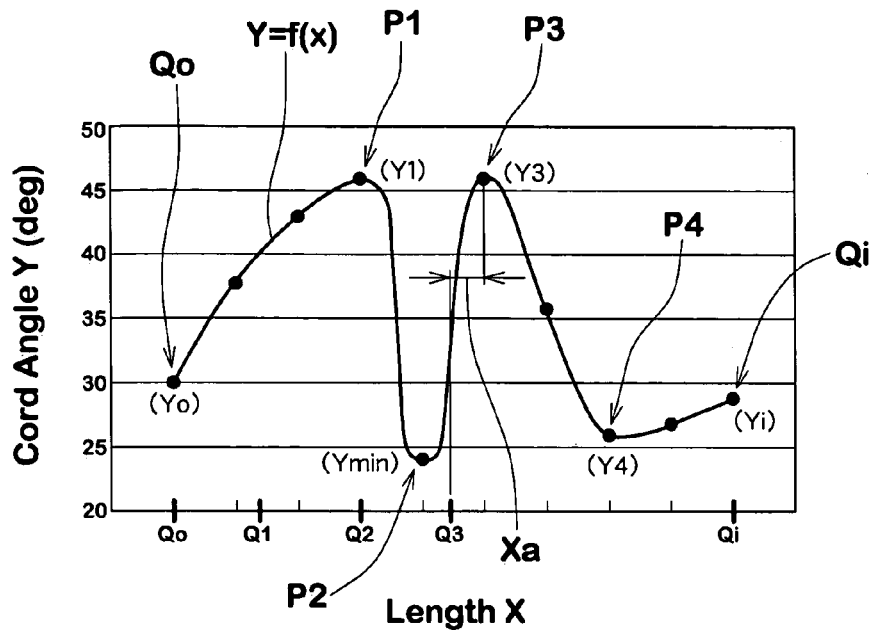
FIG. 11 is a diagram illustrating a cord angle curve Y=f(X) with a length X from a tip end of an outer piece towards a tip end of an inner piece of the bead reinforcing layer along the bead reinforcing layer being oriented along the abscissa while a cord angle Y of the reinforcing cords at the position of length X with respect to the tire circumferential direction being oriented along the ordinate.

Thus, as illustrated in FIGS. 10 and 11, there is employed a cord alignment in which the cord angles Y are varied upon repeating increase and decrease while including at least three inflections R in the course of extending from the tip end Qo of the outer piece 15o to the tip end Qi of the inner piece 15i of the bead reinforcing layer 15.

In this respect, FIG. 10 is an expansion view illustrating an aligned condition of reinforcing cords 30 with the bead reinforcing layer 15 being exploded in a planar form, and FIG. 11 illustrates a cord angle curve Y=f(X). In the cord angle curve Y=f(X), a length in the radial direction along the bead reinforcing layer 15 in a direction from the tip end Qo of the outer piece 15o towards the tip end Qi of the inner piece 15i side is defined as X. The cord angle of the reinforcing cords 30 at the position of this length X is defined to be Y.

As particularly illustrated in FIG. 11, the bead reinforcing layer 15 is arranged in that, in the cord angle curve f(X), <1> it includes at least three inflections(points of inflection) R, that is, a second inflection R2 at which the cord angle Y becomes a minimum value Ymin and first and third inflections R1, R3 on both sides thereof;

<2> a differential coefficient f'(X) of the cord angle curve f(X) is positive in a region between the tip end Qo and the first inflection R1;

<3> the differential coefficient f'(X) is negative in a region between the first and second inflections R1, R2;

<4> the differential coefficient f'(X) is positive in a region between the second and third inflections R2, R3; and <5> the second inflection R2 is positioned between a core bottom point Q2 and a core inner end opposing point Q3.

Here, the inflections R of the cord angle curve f(X) are points, as known, at which the differential coefficient f'(X) of the cord angle curve f(X) becomes 0. The increase/decrease of the cord angle Y is changed at the inflections R. The term "core bottom point Q2" denotes a point, as illustrated in FIG. 9, at which a line, which passes through a center of gravity point G of the bead core 5 and that is perpendicular to the lower surface SL, intersects with the bead reinforcing layer 15. The term "core inner end opposing point Q3" denotes a point at which a line, which passes through the inner end of the bead core 5 in the tire axial direction and which is parallel to the lower surface SL, intersects with the bead reinforcing layer 15. In this respect, a point at which a line, which passes through the outer end of the bead core 5 in the tire axial direction and which is parallel to the lower surface SL, intersects with the bead reinforcing layer 15 is referred to as a core outer end opposing point Q1.

Owing to the above features <1> to <4>, the cord angle curve f(X) will draw a curve that has a substantially M-shaped form. More particularly, the cord angle Y reduces in approaching the tip end Qo in a region between the tip end Qo and the first inflection P1 and it reduces in approaching the tip end Qi in a region between the third inflection P3 and the tip end Qi. This means that high reinforcing effects can be secured in which the cord angle Y is set low at the outer piece 15o and the inner piece 15i. As a result, it is possible to exhibit effects of restricting collapsing of the carcass ply 6A.

Moreover, in the cord angle curve f(X), the second inflection R2 at which the cord angle Y becomes a minimum value Ymin is positioned between the core bottom point Q2 and the core inner end opposing point Q3, and preferably upon being deflected towards the core inner end opposing point Q3. With this arrangement, the inner end position A can be directly and firmly reinforced so that damages at the inner end position A can be effectively restricted while also restricting collapsing of the carcass ply 6A.

On the other hand, in the cord angle curve f(X), the cord angle Y becomes large at the first and third inflections R1, R3. Accordingly, lapel of the bead reinforcing layer 15 around the bead core can be easily performed, and the workability and productivity can accordingly be maintained. In this manner, the bead reinforcing layer 15 of the present embodiment is suited for use in a bead-wind structure and workability of lapel and others can be maintained. It is further possible to effectively restrict damages at the inner end position A that are peculiar to a bead-wind structure while using a smaller amount of steel.

The first inflection R1 is preferably located further inside in the tire radial direction than the core outer end opposing point Q1, and the third inflection P3 is preferably located further outside in the tire radial direction than the core inner end opposing point Q3. The reason for this is that when the first inflection R1 is located further outside in the tire radial direction than the core outer end opposing point Q1, the cord angle Y at the outer piece 15o will not be sufficiently reduced so that effects of restricting collapsing of the carcass ply 6A tends to be degraded. Also, when the third inflection P3 is located further inside in the tire radial direction than the core inner end opposing point Q3, the cord angle Y at the core inner end opposing point Q3 will become large so that direct reinforcement to the inner end position A will be reduced.

In view of this point, it is preferable to locate the first inflection R1 proximate to the core bottom point Q2, and the distance Xa of the third inflection P3 from the core inner end opposing point Q3 is preferably set in a range of 10 to 50% of the core width W0 of the bead core 5 (as illustrated in FIG. 9). In this respect, the term "proximate to the core bottom point Q2" denotes a range in which the distance from the core bottom point Q2 is not more than 10 mm, and preferably denotes a region that is not more than 7 mm and even more preferably not more than 4 mm.

For even highly exhibiting the above-described functions and results, the bead reinforcing layer 15 is preferably arranged in that <6> a cord angle Yo at the tip end Qo is defined as 25 to 35 degrees, and a difference Y1-Yo between the same and a cord angle Y1 at the first inflection R1 as not less than 10 degrees, <7> a cord angle Yi at the tip end Qi is defined as 20 to 35 degrees, and a difference Y3-Yi between the same and a cord angle Y3 at the third inflection R3 as not less than 10 degrees, and <8> the minimum value Ymin of the cord angle Y is defined as 20 to 30 degrees.

The reason for this is that when the angles Yo, Yi and Ymin respectively become less than 25 degrees, 20 degrees, and 20 degrees, the workability of lapel is harmed. On the other hand, when the angles Y0, Yi and Ymin respectively become larger than 35 degrees, 35 degrees, and 30 degrees, effects of restricting damages at the inner end position A will become insufficient. Further, when the difference between cord angles Y1-Yo and the difference Y3-Yi become less than 10 degrees, respectively, it will become difficult to achieve both, maintenance of workability of lapel and restriction of damages at the inner end position A. In this respect, upper limits for the difference Y1-Yo and difference Y3-Yi are preferably not more than 50 degrees, respectively, and when these values are exceeded, modeling of the reinforcing cords 30 becomes excess so that the strength of the cords themselves is degraded. In this respect, reinforcing cords 30 having a tensile strength in the range of 800 to 1,500 N may be suitably employed.

In this respect, the bead reinforcing layer 15 may include a fourth inflection P4 between the third inflection P3 and the tip end Qi at which a cord angle Y4 becomes small. However, for securing workability of lapel, it is preferable that the cord angle Y4 is in the range of 20 to 35 degrees, similar to the cord angle Yi.

Figure 12:
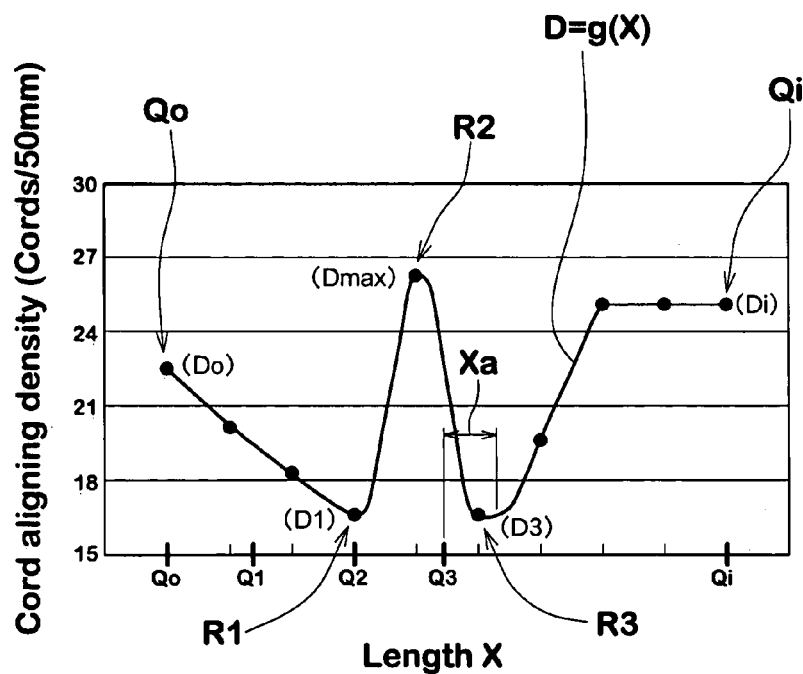
FIG. 12 is a diagram illustrating a cord alignment density curve D=g(X) with a length X from a tip end of an outer piece towards a tip end of an inner piece of the bead reinforcing layer along the bead reinforcing layer being oriented along the abscissa while a cord aligning density D of the reinforcing cords at the position of length X being oriented along the ordinate.

A case in which the cord aligning density curve D=g(X) of the reinforcing cords 30 as illustrated in FIGS. 10 and 12 is defined will now be explained.

More particularly, for the purpose of reinforcing the inner end position A itself, it will be necessary to obtain a high and dense cord aligning density D of the reinforcing cords at the inner end position A. For restricting collapsing(falling) of the carcass ply 6A, it will be necessary to obtain a high and dense cord aligning density D at the outer piece 15o and the inner piece 15i. However, when the alignment becomes dense over the entire region of the bead reinforcing layer 15, it will become difficult to perform lapel in a U-shaped manner around the bead core so that drawbacks are exhibited in that the workability is degraded or operations become difficult.

Accordingly, as illustrated in FIG. 12, there is employed a cord alignment in which the cord aligning density D is varied upon repeating increase and decrease while including at least three inflections R in the course of extending from the tip end Qo of the outer piece 15o to the tip end Qi of the inner piece 15i of the bead reinforcing layer 15.

FIG. 12 illustrates a cord aligning density curve D=g(X). In the cord aligning density curve D=g(X), the length in the radial direction along the bead reinforcing layer 15 in a direction from the tip end Qo of the outer piece 15o to the tip end Qi of the inner piece 15i side is defined as X. The cord aligning density of the reinforcing cords 30 at the position of length X is defined as D. In this respect, the cord aligning density D is described upon converting the same into a number of cords that is disposed per each width of 50 mm in a direction that is orthogonal to the cords.

As particularly illustrated in FIG. 12, the bead reinforcing layer 15 is arranged in that, in the cord alignment density curve g(X), <1> it includes at least three inflections R(points of inflection), namely a most dense second inflection R2 at which the cord aligning density D becomes a maximum value Dmax and first and third inflections R1, R3 on both sides thereof;

<2> a differential coefficient g'(X) of the cord aligning density curve g(X) is negative in a region between the tip end Qo and the first inflection R1;

<3> the differential coefficient g'(X) is positive in a region between the first and second inflections R1, R2;

<4> the differential coefficient g'(X) is negative in a region between the second and third inflections R2, R3; and <5> the second inflection R2 is positioned between the core bottom point Q2 and the core inner end opposing point Q3.

Owing to the above features <1> to <4>, the cord aligning density curve g(X) will draw a curve that has a substantially w-shaped form. More particularly, the cord aligning density D increases in approaching the tip end Qo in a region between the tip end Qo and the first inflection R1, and it increases in approaching the tip end Qi in a region between the third inflection R3 and the tip end Qi. This means that high reinforcing effects can be secured in which a dense cord alignment is set at the outer piece 15o and the inner piece 15i, and it is possible to exhibit effects of restricting collapsing of the carcass ply 6A.

Moreover, in the cord aligning density curve g(X), the second inflection R2 at which the cord aligning density D becomes a maximum value Dmax is positioned between the core bottom point Q2 and the core inner end opposing point Q3, and preferably upon being deflected towards the core inner end opposing point Q3. With this arrangement, the inner end position A can be firmly reinforced so that damages at the inner end position A can be effectively restricted while also restricting collapsing of the carcass ply 6A.

On the other hand, in the cord aligning density curve g(X), the cord aligning density D becomes small (coarse) at the first and third inflections R1, R3 so that lapel of the bead reinforcing layer 15 around the bead core can be easily performed, and the workability and productivity can accordingly be maintained. In this manner, the bead reinforcing layer 15 of the present embodiment is suited for use in a bead-wind structure and workability of lapel and others can be maintained. It is further possible to effectively restrict damages at the inner end position A that are peculiar to a bead-wind structure while using a smaller amount of steel.

Further, the first inflection R1 is preferably located further inside in the tire radial direction than the core outer end opposing point Q1, and particularly proximate to the core bottom point Q2. Also, the third inflection R3 is preferably located further outside in the tire radial direction than the core inner end opposing point Q3, and particularly apart from the core inner end opposing point Q3 by a distance Xa corresponding to 10 to 50% of the core width W0.

For even highly exhibiting the above-described functions and results, the bead reinforcing layer 15 is preferably arranged in that <6> the cord aligning density Do at the tip end Qo is defined to be 19 to 25 cords/50 mm, and a difference D1−Do between the same and the cord aligning density D1 at the first inflection R1 is defined to be not less than 3 cords/50 mm, <7> the cord aligning density Di at the tip end Qi is defined to be 22 to 28 cords/50 mm, and a difference D3−Di between the same and the cord aligning density D3 at the third inflection R3 is defined to be not less than 5 cords/50 mm, and <8> the maximum value Dmax of the cord aligning density D is defined to be 22 to 28 cords/50 mm.

The reason for this is that when the cord aligning densities Do, Di and Dmax become less than 19 cords/50 mm, less than 22 cords/50 mm and less than 22 cords/50 mm, respectively, effects of restricting damages at the inner end position A will become insufficient, and on the other hand, when the cord aligning densities Do, Di and Dmax become larger than 25 cords/50 mm, more than 28 cords/50 mm, and 28 cords/50 mm, respectively, it will result in harming the workability of lapel. When the differences D1−Do and D3−Di between cord aligning densities become less than 3 cords/50 mm and 5 cords/50 mm, respectively, it will become difficult to achieve both, maintenance of workability of lapel and restriction of damages at the inner end position A. In this respect, the upper limit value for the difference D1−Do and the difference D3−Di is preferably not more than 15 cords/50 mm, and when this value is exceeded, modeling of the reinforcing cords 30 becomes excess so that the strength of the cords themselves is degraded.

In this respect, it is also possible to employ both the cord angle curves Y=f(X) and D=g(X) in the pneumatic tire.

While particularly preferred embodiments of the present invention have been explained above, the present invention is not limited to the illustrated embodiment alone but may be embodied upon modifying the same into various forms.

EXAMPLE 1

Heavy duty radial tires (11R22.5) having a structure as illustrated in FIGS. 1, 5 and 6 and being based on the specifications in Table 1 were manufactured on trial, and the bead durability of the respective sample tires was measured and compared. In this respect, specifications other than those described in the table are common to all.

Figure 13:
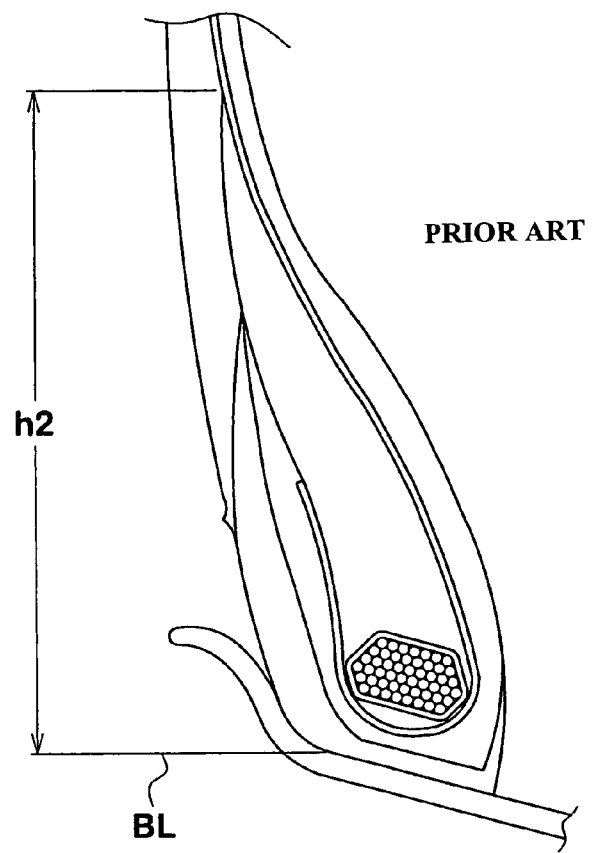
FIG. 13 is a sectional view illustrating a bead structure of the prior art as indicated in the table.
Figure 14:
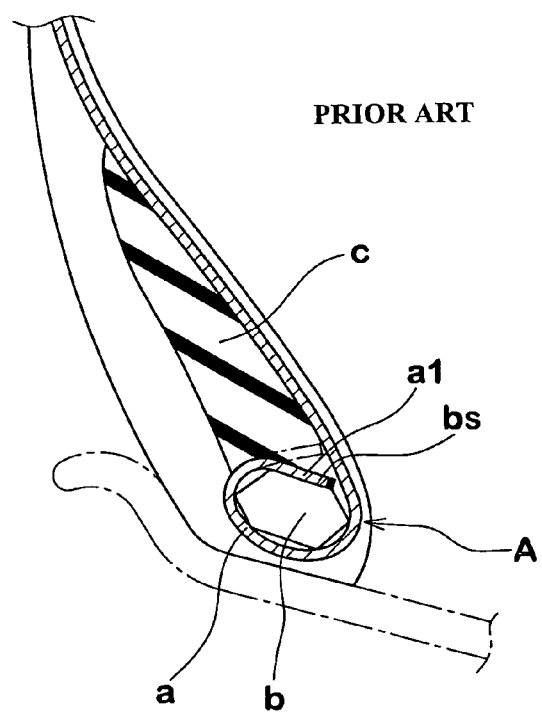
FIG. 14 is a sectional view for explaining a prior art example of bead-wind structure.

The prior art was arranged in that the ply lapelled portions of the carcass were wound up along outer sides of the bead apex rubber as illustrated in FIG. 13 wherein a height h2 of the ply lapelled portion from the bead base line was defined as 65 mm.

(1) Bead Durability:

<i> General Bead Durability:

A drum tester was employed for making the tires perform running at a velocity of 30 km/h with conditions being 7.50×22.5 for the rim, 700 kPa for the internal pressure, and 27.25 kN×3 for the longitudinal load, and driving times until damages occurred at the bead portion were indicated as indices with that of the prior art being defined as 100. The greater the values are, the higher the durability is.

<ii> Thermal Bead Durability:

The above-described bead durability test was executed in a condition in which the rim was heated to 130 C, and driving times until damages occurred at the bead portion were indicated as indices with that of the prior art being defined as 100. In this respect, in view of thermal bead durability, damages occurred at the inner end position of the bead core in the tire axial direction that were due to loosing of cords.

TABLE 1

|  | Example 1 | Prior Art |
|---|---|---|
| Bead structure | Bead-wind | FIG. 13 |
| Winding portion: |  |  |
| Distance La <mm> | 7 | — |
| Distance Lb <mm> | 3 | — |
| Filler rubber: |  |  |
| Complex elastic modulus Ea* <Mpa> | 9 | — |
| Bead reinforcing layer: |  |  |
| Height Hi <mm> | 27 | — |
| Height Ho <mm> | 27 | — |
| Cord alignment of lapelled portion | S-shaped warp | Substantially straight-linear |
| Cord angle distribution | Distance X (*1) | Angle α (*2) | — |
| Tip end of lapelled portion Pa | −30 | 84 (f2 side) | — |
|  | −20 | 78 (f2 side) | — |
| Minimum angle position | −10 | 72 (f2 side) | — |
| Inflection R0 | −5 | 0 | — |
| Central position Jo | 0 | 72 (f1 side) | — |
| Minimum angle position Q1 | 5 | 70 (f1 side) | — |
|  | 10 | 72 (f1 side) | — |
|  | 20 | 76 (f1 side) | — |
|  | 30 | 82 (f1 side) | — |
|  | 40 | 88 (f1 side) | — |
| Bead strength: |  |  |
| General bead durability | 120 | 100 |
| Thermal bead durability | 120 | 100 |

(*1) Distance X in radial direction originating from the central position No of the core lower surface opposing region N. The ply main body portion 6a side is indicated as + and the tip end Pa side as −.
(*2) Cord angle α at position of distance X. f1, f2 indicate inclining directions of the cords. The core lower surface opposing region is in the range of X (−10 to +10).

EXAMPLE 2

Heavy duty radial tires (11R22.5) having a structure as illustrated in FIGS. 1 and 7 and being based on the specifications in Table 2 were manufactured on trial, and the bead durability of the respective sample tires was measured and compared. In this respect, specifications other than those described in the table are common to all. All remaining conditions were similar to those of Example 1.

TABLE 2

|  | Example 1 | Prior Art |
|---|---|---|
| Bead structure | Bead-wind | FIG. 13 |
| Winding portion: |  |  |
| Distance La <mm> | 12 | — |
| Distance Lb <mm> | 2 | — |
| Filler rubber: |  | — |
| Complex elastic modulus Ea* <Mpa> | 9 | — |
| Bead reinforcing layer: |  |  |
| Height Hi <mm> | 25 | 25 |
| Height Ho <mm> | 27 | 27 |

TABLE 2-continued

|  | Example 1 | Prior Art |
|---|---|---|
| Cord alignment of lapelled portion | Warped | Straight-linear |
| Central arc portion | *1 | — |
| Radius of curvature Rc <mm> | 40 | — |
| First side arc portion | *1 | — |
| Radius of curvature Rs1 <mm> | 180 | — |
| Second side arc portion | *1 | — |
| Radius of curvature Rs2 <mm> | 900 | — |
| Bead strength: |  |  |
| General bead durability | 120 | 100 |
| Thermal bead durability | 120 | 100 |

*1 When the origin is defined to the central position No of the core lower surface opposing region N, and the distance in the radial direction is indicated such that the ply main body portion 6a side is + and the tip end Pa side as −, the central arc position lies in the range of (0 mm to +5 mm), the first side arc portion lies in the range of (+10 mm to +30 mm), and the second side arc portion lies in the range of (−20 mm to 30 mm). The core lower surface opposing region N is in the range of (−10 mm to +10 mm).

EXAMPLE 3

Heavy duty radial tires (11R22.5) having a structure as illustrated in FIGS. 1 and 10 to 12 and being based on the specifications as illustrated in Table 3 and heavy duty radial tires (11R22.5) being based on the specifications as illustrated in Table 4 were respectively manufactured on trial, and the bead durability of the respective sample tires was measured and compared. In this respect, specifications other than those described in the tables are common to all. All remaining conditions were similar to those of Example 1.

TABLE 3

|  | Example 1 | Example 2 | Example 3 | Prior Art |
|---|---|---|---|---|
| Bead structure | Bead-wind | Bead-wind | Bead-wind | FIG. 13 |
| Winding portion |  |  |  |  |
| Distance La <mm> | 7 | 7 | 7 | — |
| Distance Lb <mm> | 2 | 2 | 2 | — |
| Filler rubber |  |  |  |  |
| Complex elastic modulus Ea* <Mpa> | 9 | 9 | 9 | — |
| Bead reinforcing layer |  |  |  |  |
| Cord tensile strength <N> | 830 | 830 | 830 | 830 |
| Height Hi <mm> | 27 | 27 | 27 | 27 |
| Height Ho <mm> | 27 | 27 | 27 | 27 |
| Cord angle Yo <degrees> | 30 | 40 | 30 | — |
| Cord angle Y1 <degrees> | 47 | 47 | 47 | — |
| Cord angle Ymin <degrees> | 25 | 25 | 25 | — |
| Cord angle Y3 <degrees> | 45 | 45 | 45 | — |
| Cord angle Yi <degrees> | 27 | 27 | 35 | — |
| Bead strength |  |  |  |  |
| General bead durability | 120 | 115 | 110 | 100 |
| Thermal bead durability | 120 | 110 | 115 | 100 |

TABLE 4

|  | Example 1 | Example 2 | Example 3 | Prior Art |
|---|---|---|---|---|
| Bead structure | Bead-wind | Bead-wind | Bead-wind | FIG. 13 |
| Winding portion |  |  |  |  |
| Distance La <mm> | 7 | 7 | 7 | — |
| Distance Lb <mm> | 2 | 2 | 2 | — |
| Filler rubber |  |  |  |  |
| Complex elastic modulus Ea* <Mpa> | 9 | 9 | 9 | — |
| Bead reinforcing layer |  |  |  |  |
| Cord tensile strength <N> | 830 | 830 | 830 | 830 |
| Height Hi <mm> | 27 | 27 | 27 | 27 |
| Height Ho <mm> | 27 | 27 | 27 | 27 |
| Cord aligning density Do <cords/50 mm> | 23 | 20 | 23 | 23 |
| Cord aligning density D1 <cords/50 mm> | 17 | 17 | 17 | 23 |
| Cord aligning density Dmax <cords/50 mm> | 26 | 26 | 26 | 23 |
| Cord aligning density D3 <cords/50 mm> | 17 | 17 | 17 | 23 |
| Cord aligning density Di <cords/50 mm> | 25 | 25 | 21 | 23 |
| Bead strength |  |  |  |  |
| General bead durability | 120 | 115 | 110 | 100 |
| Thermal bead durability | 120 | 110 | 115 | 100 |

What is claimed is:

1. A heavy duty radial tire comprising a carcass ply in which a carcass ply main body that extends from a tread portion over side wall portions up to bead cores of bead portions and ply lapelled portions that are lapelled from inside to outside in the tire axial direction around the bead cores, wherein each ply lapelled portion comprising of a main portion and a winding portion, the main portion being bent along an inner surface in the tire axial direction, a lower surface in the radial direction and an outer surface in the tire axial direction of the bead core, the winding portion continuing from the main portion and extending towards the ply main body portion upon separating from the top surface thereof in the radial direction at an angle that is smaller than 90 degrees, and the ply lapelled portion including one-side inclined region that extends up to an inflection R0 that is located in a core lower surface opposing region and the other-side inclined region that extends from the inflection R0 to a tip end Pa of the ply lapelled portion, wherein the core lower surface opposing region is a region in which carcass cords face to the lower surface of the bead core in the radial direction, the one-side inclined region extending while inclining to one side in the tire circumferential direction, the other-side inclined region extending while inclining to the other side in the tire circumferential direction, the one-side inclined region including a minimum angle position Q1 within the core lower surface opposing region in which a cord angle α of the carcass cords with respect to the tire circumferential direction becomes a minimum value α1 min, and the cord angle α increasing from the minimum angle position Q1 in approaching the ply main body side and the inflection R0, the other-side inclined region including a minimum angle position Q2 between the inflection R0 and the tip end Pa of the ply lapelled portion in which the cord angle α becomes a minimum value α2 min, and the cord angle α increasing from the minimum angle position Q2 in approaching the inflection R0 and the tip end Pa of the ply lapelled portion.

2. The heavy duty radial tire as claimed in claim 1, wherein the minimum values α1 min, α2 min are in a range of 60 to 80 degrees.

3. The heavy duty radial tire as claimed in claim 1, wherein the minimum angle position Q2 is positioned within the main portion of the ply lapelled portion.

4. The heavy duty radial tire as claimed in claim 1, wherein the bead portion includes a bead reinforcing layer having a curved portion that faces along the main portion of the ply lapelled portion and inside thereof in the radial direction, and an outer piece outside of the curved portion in the tire axial direction and that inclines outside in the tire axial direction towards outside in the radial direction upon separating from the main portion, and wherein a height Ho of the outer piece in the radial direction from a bead base line is defined to be 10 to 35 mm.

5. The heavy duty radial tire as claimed in claim 1, wherein a distance La of the tip end of the winding portion from the top surface of the bead core in the radial direction is 5 to 12 mm, and wherein a distance Lb thereof from the ply main body portion is 1 to 5 mm.

6. The heavy duty radial tire as claimed in claim 1, wherein by interposing a central arc portion of a radius of curvature Rc including an inflection R0 between the one-side inclined region and the other-side inclined region, the carcass cords are warped in a trough-like manner, the central arc portion being comprised of an arc portion having a radius of curvature Rc with its center being located on one side in the tire circumferential direction, and wherein the one-side inclined region being comprised of an arc portion that continues to the central arc portion on the ply main body portion side and that has a radius of curvature Rs1 with its center being located on the other side in the tire circumferential direction, the other-side inclined region being comprised of an arc portion that continues to the central arc portion on the tip end side of the winding portion and that has a radius of curvature Rs2 with its center being located on the other side in the tire circumferential direction.

7. The heavy duty radial tire as claimed in claim 1, wherein the radius of curvature Rc of the central arc portion is not more than 100 mm, the radius of curvature Rs1 of the one-side inclined region larger than 100 mm and not more than 300, and the radius of curvature Rs2 on the other-side inclined region not less than 500 mm and not more than 1500 mm.

8. A heavy duty radial tire comprising a carcass ply in which a carcass ply main body that extends from a tread portion over side wall portions up to bead cores of bead portions and ply lapelled portions that are lapelled from inside to outside in the tire axial direction around the bead cores, wherein each ply lapelled portion comprising of a main portion and a winding portion, the main portion being bent along an inner surface in the tire axial direction, a lower surface in the radial direction and an outer surface in the tire axial direction of the bead core, the winding portion continuing from the main portion and extending towards the ply main body portion along a top surface of the bead core in the radial direction or upon separating from the top surface thereof in the radial direction at an angle that is smaller than 90 degrees, and the bead portion comprising a bead reinforcing layer in which reinforcing cords are aligned, wherein the bead reinforcing layer includes a curved portion that faces along the main portion of the ply lapelled portion and inside thereof in the radial direction, an outer piece outside of the curved portion in the tire axial direction and that inclines outside in the tire axial direction towards outside in the radial direction upon separating from the main portion, and an inner piece that extends inside of the curved portion in the tire axial direction along the inner surface of the ply main body portion in the tire axial direction, and wherein in a cord angle curve $Y=f(X)$ when a length along the bead reinforcing layer from a tip end Qo of the outer piece to a tip end Qi of the inner piece of the bead reinforcing layer is defined as X and a cord angle of the reinforcing cords with respect to the tire circumferential direction at a position of the length X is defined as Y, the cord angle curve $f(X)$ includes at least three inflections R, that is, a second inflection R2 at which the cord angle Y becomes a minimum value Ymin, and first and third inflections R1, R3 on both sides thereof, a differential coefficient $f'(X)$ of the cord angle curve $f(X)$ being positive between the tip end Qo and the first inflection R1, a differential coefficient $f'(X)$ between the first and second inflections R1, R2 being negative, and a differential coefficient $f'(X)$ between the second and third inflections R2, R3 being positive, and wherein the second inflection R2 is positioned between a core bottom point at which a line, which passes through a center of gravity point G of the bead core and which is perpendicular to the lower surface in the radial direction, intersects with the bead reinforcing layer, and a core inner end opposing point at which a line, which passes through an inner end of the bead core in the tire axial direction and which is parallel to the loser surface in the radial direction, intersects with the bead reinforcing layer.

9. The heavy duty radial tire as claimed in claim 8, wherein the first inflection R1 is positioned further inside in the tire radial direction than a core outer end opposing point at which a line, which passes through the outer end of the bead core in the tire axial direction and that is parallel to the lower surface in the radial direction, intersects with the bead reinforcing layer, and wherein the third inflection R3 is positioned further outside of the core inner end opposing point in the tire radial direction.

10. The heavy duty radial tire as claimed in claim 8, wherein the first inflection R1 is located proximate to the core bottom point.

11. The heavy duty radial tire as claimed in claim 8, wherein a distance Xa of the third inflection P3 from the core inner end opposing point is 10 to 50% of a core width w of the bead core.

12. The heavy duty radial tire as claimed in claim 8, wherein a cord angle Yo at the tip end Qo of the outer piece is 25 to 35 degrees, and a difference Y1−Yo between the same and a cord angle Y1 at the first inflection P1 is not less than 10 degrees, wherein a cord angle Yi at the tip end Qi of the inner piece is 20 to 35 degrees, and a difference Y3−Yi between the same and a cord angle Y3 at the third inflection P3 is not less than 10 degrees, and wherein a minimum value Ymin of the cord angle Y is 20 to 30.

13. The heavy duty radial tire as claimed in claim 8, wherein a height Hi of the inner piece in the radial direction from the bead base line is 15 to 50 mm, and wherein a height Ho of the outer piece in the radial direction from the bead base line is 15 to 40 mm.

14. The heavy duty radial tire as claimed in claim 8, wherein a distance La of the tip end of the winding portion from the top surface of the bead core in the radial direction is 5 to 12 mm, and wherein a distance Lb thereof from the ply main portion is 1 to 5 mm.

15. A heavy duty radial tire comprising a carcass ply in which a carcass ply main body that extends from a tread portion over side wall portions up to bead cores of bead portions and ply lapelled portions that are lapelled from inside to outside in the tire axial direction around the bead cores, wherein each ply lapelled portion is comprised of a main portion and a winding portion, the main portion being bent along an inner surface in the tire axial direction, a lower surface in the radial direction and an outer surface in the tire axial direction of the bead core, the winding portion continuing from the main portion and extending towards the ply main body portion upon contacting a top surface of the bead core in the radial direction or upon separating from the top surface thereof in the radial direction at an angle that is smaller than 90 degrees, and the bead portion comprising a bead reinforcing layer in which reinforcing cords are aligned, wherein the bead reinforcing layer includes a curved portion that faces along the main portion of the ply lapelled portion and inside thereof in the radial direction, an outer piece outside of the curved portion in the tire axial direction and that inclines outside in the tire axial direction towards outside in the radial direction upon separating from the main portion, and an inner piece that extends inside of the curved portion in the tire axial direction along the inner surface of the ply main body portion in the tire axial direction, and wherein in a cord aligning density curve $D=g(X)$, when a length along the bead reinforcing layer in a direction from a tip end Qo of the outer piece to a tip end Qi of the inner piece of the bead reinforcing layer is defined as X and a cord aligning density of the reinforcing cords at the position of length X is defined as D, the cord aligning density curve $g(X)$ includes at least three inflections R, that is, a second inflection R2 at which the cord aligning density D becomes a maximum value Dmax, and first and third inflections R1, R3 on both sides thereof, a differential coefficient g'(X) of the cord aligning density curve g(X) being negative between the tip end Qo and the first inflection R1, a differential coefficient g'(X) between the first and second inflections R1, R2 being positive, and a differential coefficient g'(X) between the second and third inflections R2, R3 being negative, and wherein the second inflection P2 is positioned between a core bottom point at which a line, which passes through a center of gravity point G of the bead core and which is perpendicular to the lower surface in the radial direction, intersects with the bead reinforcing layer and a core inner end opposing point at which a line, which passes through an inner end of the bead core in the tire axial direction and which is parallel to the lower surface in the radial direction, intersects with the bead reinforcing layer.

16. The heavy duty radial tire as claimed in claim 15, wherein the first inflection R1 is positioned further inside in the tire radial direction than a core outer end opposing point Q1 at which a line, which passes through the outer end of the bead core in the tire axial direction and that is parallel to the lower surface in the radial direction, intersects with the bead reinforcing layer, and wherein the third inflection R3 is positioned further outside of the core inner end opposing point Q3 in the tire radial direction.

17. The heavy duty radial tire as claimed in claim 15, wherein the first inflection R1 is located proximate to the core bottom point Q2.

18. The heavy duty radial tire as claimed in claim 15, wherein a distance Xa of the third inflection R3 from the core inner end opposing point is 10 to 50% of a core width W0 of the bead core.

19. The heavy duty radial tire as claimed in claim 15, wherein the cord aligning density Do at the tip end Qo of the outer piece is 19 to 25 cords/50 mm, and a difference D1–Do between the same and the cord aligning density D1 at the first inflection R1 is not less than 3 cords/50 mm, wherein the cord aligning density Di at the tip end Qi of the inner piece is 22 to 28 cords/50 mm, and a difference D3–Di between the same and the cord aligning density D3 at the third inflection R3 is not less than 5 cords/50 mm, and wherein a maximum value Dmax of the cord aligning density D is 22 to 28 cords/50 mm.

20. The heavy duty radial tire as claimed in claim 15, wherein a height Hi of the inner piece in the radial direction from the bead base line is 15 to 50 mm, and wherein a height Ho of the outer piece in the radial direction from the bead base line is 15 to 40 mm.

21. The heavy duty radial tire as claimed in claim 15, wherein a distance La of the tip end of the winding portion from the top surface of the bead core in the radial direction is 5 to 12 mm, and wherein a distance Lb thereof from the ply main portion is 1 to 5 mm.

* * * * *